United States Patent
Miller

(10) Patent No.: US 9,787,597 B1
(45) Date of Patent: Oct. 10, 2017

(54) METHODS, SYSTEMS, AND ARTICLES OF MANUFACTURE FOR IMPLEMENTING MODEL DEFINITION AND CONSTRAINT ENFORCEMENT AND VALIDATION

(71) Applicant: Intuit Inc., Mountain View, CA (US)

(72) Inventor: Gregory W. Miller, San Diego, CA (US)

(73) Assignee: UNTUIT INC., Mountain View, CA (US)

( * ) Notice: Subject to any disclaimer, the term of this patent is extended or adjusted under 35 U.S.C. 154(b) by 300 days.

(21) Appl. No.: 14/104,911

(22) Filed: Dec. 12, 2013

(51) Int. Cl.
G06F 15/173 (2006.01)
H04L 12/911 (2013.01)

(52) U.S. Cl.
CPC .................... H04L 47/70 (2013.01)

(58) Field of Classification Search
CPC ............ H04L 29/06; H04L 29/08144
USPC ....................................... 709/226
See application file for complete search history.

(56) References Cited

U.S. PATENT DOCUMENTS

| | | | |
|---|---|---|---|
| 7,428,546 B2* | 9/2008 | Nori | G06F 17/30595 |
| 7,747,484 B2 | 6/2010 | Stanley et al. | |
| 7,860,763 B1 | 12/2010 | Quinn et al. | |
| 8,204,805 B2 | 6/2012 | Eftekhari et al. | |
| 2002/0194263 A1* | 12/2002 | Murren | G06F 8/10 |
| | | | 709/203 |
| 2003/0078949 A1* | 4/2003 | Scholz | G06F 17/2247 |
| | | | 715/226 |
| 2004/0153536 A1* | 8/2004 | Strassner | H04L 41/0813 |
| | | | 709/223 |
| 2004/0205179 A1* | 10/2004 | Hunt | G06F 8/65 |
| | | | 709/223 |
| 2008/0046462 A1* | 2/2008 | Kaufman | G06F 17/30392 |
| 2008/0120129 A1* | 5/2008 | Seubert | G06Q 10/06 |
| | | | 705/35 |
| 2008/0294418 A1* | 11/2008 | Cleary | H04L 41/0803 |
| | | | 703/21 |
| 2011/0209049 A1* | 8/2011 | Ghosh | G06Q 10/06 |
| | | | 715/236 |

(Continued)

OTHER PUBLICATIONS http://en.wikipedia.org/wiki/JavaScript, printed Dec. 12, 2013 (24 pages).

(Continued)

*Primary Examiner* — Vivek Srivastava
*Assistant Examiner* — Atta Khan
(74) *Attorney, Agent, or Firm* — Vista IP Law Group LLP

(57) ABSTRACT

A client computing device identifies a model and data to be populated into the model of a webpage. The client computing device identifies a reference to a model definition resource and invokes a model definition resolver to identify the actual location of the model definition resource from a remote computer using the reference. The model definition resolver obtains the requested model definition resource from the remote computer using the actual location. The client computing device invokes one or more APIs to perform constraint enforcement on the identified data with respect to the identified model. Upon successful performance of constraint enforcement, the client computing device performs data binding for the data and the model and save the identified data, which may be further processed, into a repository of data models.

21 Claims, 19 Drawing Sheets

(56) References Cited

U.S. PATENT DOCUMENTS

2013/0218735 A1* 8/2013 Murray ................ G06Q 40/123
　　　　　　　　　　　　　　　　　　　　　705/31
2013/0254325 A1* 9/2013 Song ................... G06F 17/3048
　　　　　　　　　　　　　　　　　　　　　709/213

OTHER PUBLICATIONS www.turbotax.com, printed Dec. 12, 2013 (6 pages).
www.quicken.com, printed Dec. 12, 2013 (6 pages).
http://en.wikipedia.org/wiki/A/B_testing, printed Dec. 12, 2013 (3 pages).
http://www.pcworld.com/article/250132/tax_sites_turbotax_is_still_the_one_to_beat.html, printed Dec. 12, 2013 (9 pages).

* cited by examiner

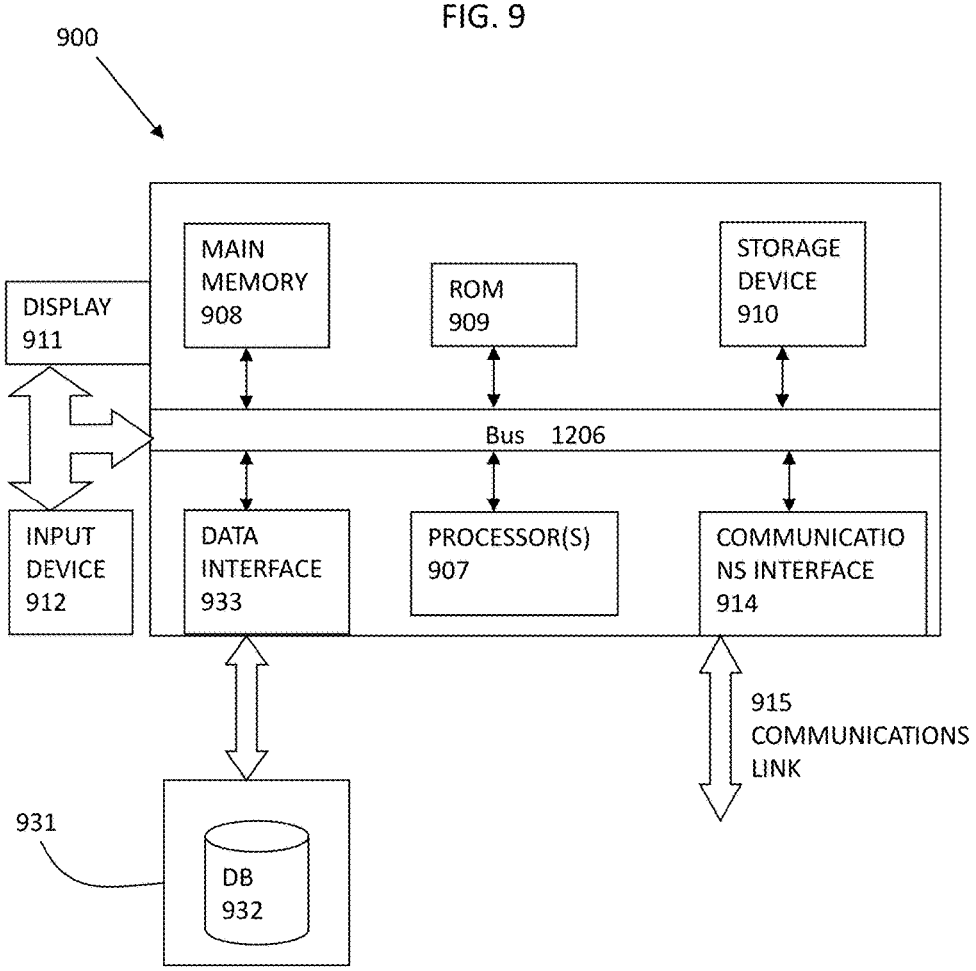

APPENDIX A – ILLUSTRATIVE VALIDATORS

1) Required
    a) Description : Field is required
    b) Parameter : none
    c) Example : `<input id="ex_required" data-validate="required" />`
    d) Validate Me
2) requiredIf
    a) Description : Field is required if model reference has a value
    b) Parameter : model reference ${model.val}
    c) Example : `<input id="ex_requiredIf" type="checkbox" data-validate="requiredIf(${layoutModel.reqif})" />`
    d) Enter value for model:

Validate Me
3) requiredIfExpression
    a) Description : Field is required if the client-side framework Expression Evaluates to true
    b) Parameter : Client-Side Framework Expression
    c) Example : `<input id="ex_requiredIfExp" type="radio" data-validate="requiredIfExpression('@{ ${layoutModel.reqifExp} >= 500') }" />`
    d) Enter value for model:

☐ Select Me ☐ No, select me! Validate Me
4) groupRequired
    a) Description : Validate input text fields are mutually exclusive. Display error if value exists in more than one of the grouped input fields. Display error if all grouped input fields are empty
    b) Parameter : groupId (id that all groups belong to)
    c) Example : `<input id="ex_groupRequired" data-validate="groupRequired(foo)" />`
    d) Validate Me
5) groupRequiredMultiple
    a) Description : Validate input text fields are mutually exclusive. DON"T Display error if value exists in more than one of the grouped input fields (unlike the standard groupRequired). Display error if all grouped input fields are empty
    b) Parameter : groupId (id that all groups belong to)
    c) Example : `<input id="ex_groupRequiredMultiple" data-validate="groupRequiredMultiple(bar)" />`

FIG. 10A d) [ ] Validate Me    FIG. 10B 6) maxLength
   a) Description : Maximum characters allowed
   b) Parameter : length - the Maximum characters allowed
   c) Example : <input id="ex_maxLength" data-validate="maxLength(4)" />
   d) [ ] Validate Me 7) minLength
   a) Description : Minimum characters allowed
   b) Parameter : length - the Minimum characters allowed
   c) Example : <input id="ex_minLength" data-validate="minLength(4)" />
   d) [ ] Validate Me 8) exactLength
   a) Description : Value must be X number of characters
   b) Parameter : length - the Exact number of characters allowed
   c) Example : <input id="ex_exactLength" data-validate="exactLength(4)" />
   d) [ ] Validate Me 9) Max
   a) Description : the Maximum value allowed.
   b) Parameter : number - representing the maximum allowed
   c) Example : <input id="ex_max" data-validate="max(4)" />
   d) [ ] Validate Me 10) Min
    a) Description : the Minimum value allowed
    b) Parameter : number - representing the minimum allowed
    c) Example : <input id="ex_min" data-validate="min(4)" />
    d) [ ] Validate Me 11) multipleOf
    a) Description : Value is a multiple of x
    b) Parameter : integer - which value must be a multiple of another
    c) Example : <input id="ex_multipleOf" data-validate="multipleOf(4)" />
    d) [ ] Validate Me 12) Same
    a) Description : the value must be the same as another field
    b) Parameter : fieldId - id of other field to validate against
    c) Parameter : fieldName - name of field to display in error message

- d) Parameter : caseINSensitive - do a case insensitive compare, defaults to false.
  Field must be same as fieldName
- e) Example : `<input id="ex_same" data-validate="same('ex_same2', 'the other field', false)" />`
- f) Validate Me 13) notSame
   - a) Description : the value must NOT be the same as another field
   - b) Parameter : fieldId - id of other field to validate against
   - c) Parameter : fieldName - name of field to display in error message
   - d) Parameter : caseINSensitive - do a case insensitive compare, defaults to false.
     Field must be same as fieldName
   - e) Example : `<input id="ex_notSame" data-validate="notSame('ex_same2', 'the other field', false)" />`
   - f) Validate Me 14) equalsVal
   - a) Description : the value must be equal to
   - b) Parameter : the value to validate against
   - c) Example : `<input data-validate="equalsVal('foo')" />`
   - d) Validate Me 15) notEqualsVal
   - a) Description : the value must be equal to
   - b) Parameter : the value to validate against
   - c) Example : `<input data-validate="notEqualsVal('foo')" />`
   - d) Validate Me 16) Email
   - a) Description : validate an email address
   - b) Parameter : none
   - c) Example : `<input id="ex_email" data-validate="email" />`
   - d) Validate Me 17) ssn
   - a) Description : validate an ssn
   - b) Parameter : allowExceptions (optional) - valid exceptions are ["applied for", "died", "tax exempt", "LAFCP", "unknown"]
   - c) Parameter : validateRange (optional) - perform a range check on the SSN
   - d) Example : `<input id="ex_ssn" data-validate="ssn" />`
   - e) Validate Me 18) Phone

FIG. 10C a) Description : validate an phone number
b) Parameter : none - will validate agains the mask "(###) ###-####"
c) Example : <input id="ex_phone" data-validate="phone" />
d) | Validate Me 19) Zip
   a) Description : validate an phone number
   b) Parameter : mustBePlus4 (optional) - zip code MUST have the extended four digits
   c) Example : <input id="ex_zip" data-validate="zip" />
   d) | Validate Me 20) creditCard
   a) Description : valid credit card number (based on luhn validation)
   b) Parameter : none
   c) Example : <input id="ex_creditCard" data-validate="creditCard" />
   d) | Validate Me 21) rtn (bank Routing Transit Number)
   a) Description : valid bank routing transit number
   b) Parameter : none
   c) Example : <input id="ex_rtn" data-validate="rtn" />
   d) | Validate Me 22) Date
   a) Description : validate a date
   b) Parameter : mask (optional) - number mask of how it should be formatted valid masks are ["MM/DD/YYYY", "MM/YYYY", "YYYY", "MM/DD", "YYYY-MM-DD"] (default is MM/YY/DDDD)
   c) Parameter : allowExceptions (optional) - valid exceptions are ["various", "inherit", "inherited", "continue", "continues", "none"]
   d) Example : <input id="ex_date" data-validate="date(MM/DD/YYYY)" />
   e) | Validate Me 23) Before
   a) Description : date is before
   b) Parameter : date string - can be "now", "today", or in the format ["MM/DD/YYYY", "MM-DD-YYYY", "MM/YYYY", "MM-YYYY", "YYYY", "YYYY/MM/DD", "YYYY-MM-DD"] (default is MM/YY/DDDD)
   c) Parameter : inclusive (optional)
   d) Example : <input id="ex_before" data-validate="before('today')" />
   e) | Validate Me 24) After

FIG. 10D a) Description : date is after
b) Parameter : date string - can be "now", "today", or in the format ["MM/DD/YYYY", "MM-DD-YYYY", "MM/YYYY", "MM-YYYY", "YYYY", "YYYY/MM/DD", "YYYY-MM-DD"] (default is MM/YY/DDDD)
c) Parameter : inclusive (optional)
d) Example : `<input id="ex_after" data-validate="after('today', true)" />`
e) Validate Me 25) Regex
a) Description : validate against a regular expression
b) Parameter : the regex string (without the begin and end slashes)
c) Parameter : message - error message to display
d) Example : `<input id="ex_regex" data-validate="regex('\d\d\d$', 'invalid 3 digit entry')" />`
e) Validate Me 26) Number
a) Description : Number, including positive, negative, and floating decimal.
b) Parameter : precision (optional)
c) Example : `<input id="ex_number" data-validate="number" />`
d) Validate Me 27) numberOnly
a) Description : Numbers 0-9 only
b) Parameter : none
c) Example : `<input id="ex_numberOnly" data-validate="numberOnly" />`
d) Validate Me 28) Alpha
a) Description : letters only
b) Parameter : allowSpace - boolean
c) Example : `<input id="ex_alpha" data-validate="alpha" />`
d) Validate Me 29) alphanumeric
a) Description : numbers and letters only
b) Parameter : allowSpace - boolean
c) Example : `<input id="ex_alphaNumeric" data-validate="alphaNumeric(true)" />`
d) Validate Me 30) uppercase
a) Description : upper case input

FIG. 10E

- b) Parameter : none
- c) Example : <input id="ex_upperCase" data-validate="upperCase" />
- d) [ Validate Me ]

31) maskedNumber
- a) Description : must match mask
- b) Parameter : mask (with # representing a number)
- c) Example : <input id="ex_maskedNumber" data-validate="maskedNumber('$###.##')" />
- d) [ Validate Me ]

FIG. 10F

METHODS, SYSTEMS, AND ARTICLES OF MANUFACTURE FOR IMPLEMENTING MODEL DEFINITION AND CONSTRAINT ENFORCEMENT AND VALIDATION

CROSS REFERENCE TO RELATED APPLICATIONS

This U.S. patent application is related to U.S. application Ser. No. 14/105,005, entitled "METHODS, SYSTEMS, AND ARTICLES OF MANUFACTURE FOR CONFIGURATION-BASED CLIENT-SIDE FLOW CONTROL FRAMEWORK FOR CUSTOMIZABLE USER EXPERIENCE" filed concurrently on Dec. 12, 2013, and U.S. application Ser. No. 14/104,859, entitled "METHODS, SYSTEMS, AND ARTICLES OF MANUFACTURE FOR CONFIGURATION-BASED CLIENT-SIDE RESOURCE RESOLUTION FRAMEWORK FOR CUSTOMIZABLE USER EXPERIENCE" filed concurrently on Dec. 12, 2013. The contents of both of the above-identified U.S. applications filed concurrently on Dec. 12, 2013 are hereby explicitly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Web applications oftentimes utilizes various JavaScript objects or models (or other objects or models in other interpreted programming languages) that reside in, for example, browser memory. Web developers may need to define what types of data may be entered into a model for at least some of the fields in the model. Such data may comprise a varieties of types entered in a variety of different manners by different users. Some of the data may thus include undesired data or even invalid data. A complex web-hosted application may include extremely large amount of data and a large number of models. Some of the data or models may interact with each other. Some of the earlier entered data or earlier executed models may even affect subsequently entered data or subsequently executed models. Including undesired data or even invalid data in various models may thus be detrimental to the user experience and also to the usability or even viability of the website hosting the software applications.

SUMMARY

Disclosed are various embodiments relating to methods, systems, and articles of manufacture for implementing model definition, constraint enforcement, and validation. Some embodiments are directed at a method for model definition, constraint enforcement, and validation. The method identifies a data element to be entered into a model whose representation is displayed or to be displayed on a webpage in a browser of a client computing device. A model includes an instance of a model class and works in concert with the model definition class to impose one or more constraints on the type(s) of data and data elements that may be inserted or incorporated in that model. The client computing device initializes and invokes a model definition resolver by executing a file obtained from a remote host computer hosting the website being accessed by a user via the client computing device.

The client computing device receives a reference to a model definition resource located on the remote host computer and transmits the reference to the model definition resolver which in turn identifies the actual location of the model definition resource on the remote host computer. The model definition classes read in model definition or configuration objects that describe one or more constraints on one or more attributes of a model and specify information about each data entry in a model as well as high level information about the model. The model definition resolver on the client computing system then requests and obtains the actual implementation of the model definition resource from the remote host computer. The client computing device may further invoke one or more application programming interfaces to perform constraint enforcement on the data based at least in part upon the actual implementation of the model definition resource obtained from the remote host computer. Upon successful completion of constraint enforcement, the client computing device may populate the data into the model and render the data in the display of the client computing device.

Some embodiments are directed at an apparatus for implementing various processes described herein. More details about the apparatus for implementing various processes will be described in some of the subsequent paragraphs with reference to one or more drawing figures.

Some embodiments are directed at an article of manufacture having stored thereupon a sequence of instructions which, when executed by a mobile communication device, causes the mobile communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 9 illustrates a block diagram of an illustrative computing system suitable for implementing various embodiments described herein. FIGS. 10A-10F illustrate some examples of illustrative validators.

Figure 1:
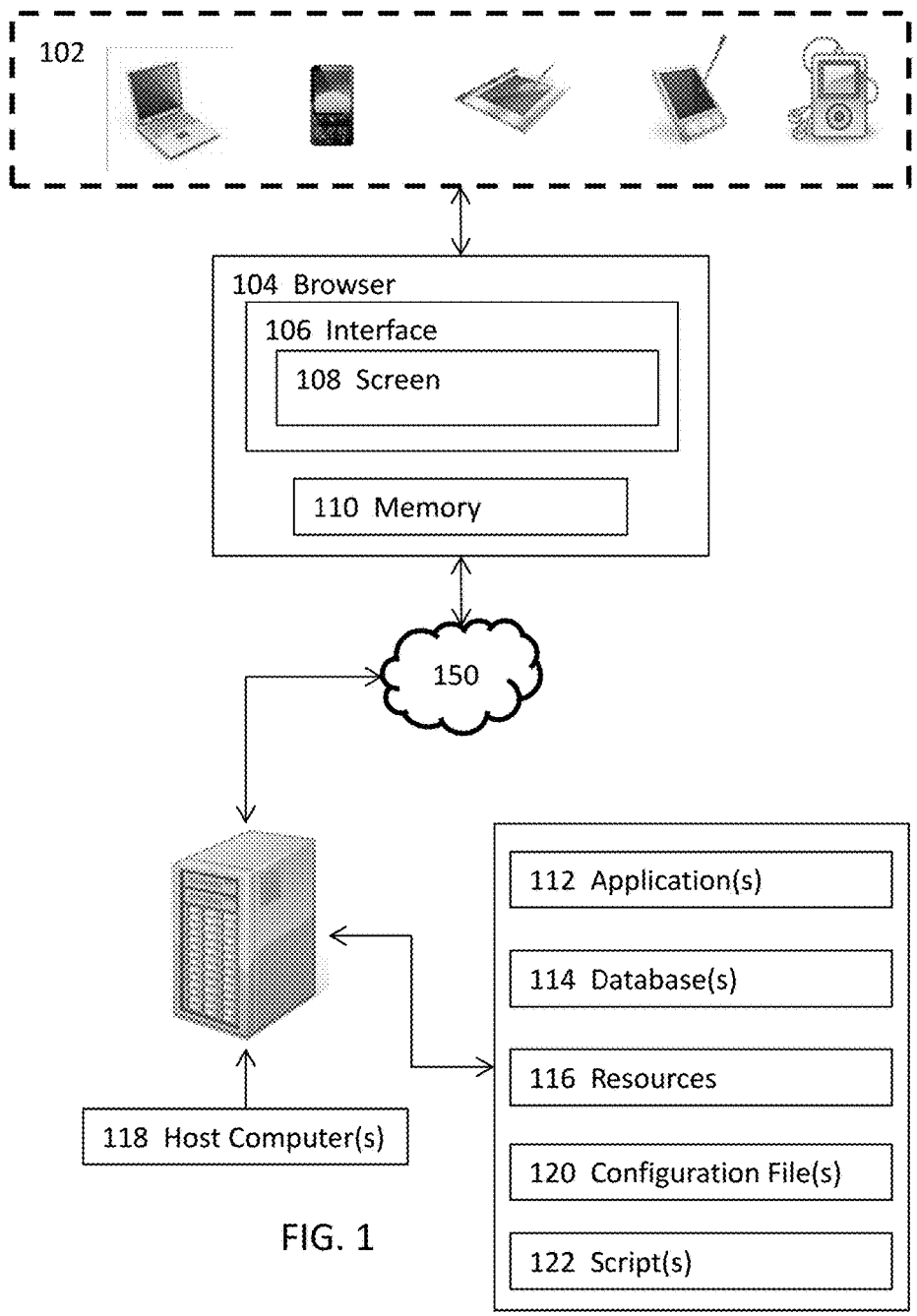
FIG. 1 illustrates a high level schematic diagram of a configuration-based client-side framework for customizable user experience in some embodiments.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

When a user interacts with a model or an object (collectively "object" in the context of object-oriented programming) of a webpage, various data may be entered into or associated with the model. The client computing device through which the user interacts with the webpage identifies the model and the data to be populated into the model. In various embodiments, a model includes an instance of a model class and works in concert with the model definition class to impose one or more constraints on the type(s) of data and data elements that may be inserted or incorporated in that model. The data are not simply incorporated into the model without further processing. Rather, the client computing device identifies a request for a reference to a model definition resource and invokes a model definition resolver to resolve the reference. The client computing device may initialize and invoke a model definition resolver by executing a file obtained from the remote host computer hosting the website being accessed by a user via the client computing device.

The model definition resolver on the client computing device uses a mapping mechanism to identify or determine the actual location of the requested model definition resource (e.g., a model definition file or object) on a remote host computer. The model definition resolver may then obtain the actual implementation (e.g., an instance of the model definition object or actual code of the model definition file) of the requested model definition resource from the remote host computer at the identified or determined actual location. The model definition classes read in model definition or configuration resources that describe one or more constraints on one or more attributes of the model and specify information about each data entry in the model as well as high level information about the model. The client computing device may further invoke one or more application programming interfaces to perform constraint enforcement on the data based at least in part upon the actual implementation of the model definition resource obtained from the remote host computer. Upon successful completion of constraint enforcement, the client computing device may populate the data into the model and render the data in the display of the client computing device.

FIG. 1 illustrates a high level schematic diagram of a configuration-based client-side framework for customizable user experience in some embodiments. More specifically, FIG. 1 illustrates a client computing device 102 having installed thereupon a web browser 104 that utilizes, for example, LAN (local area network), WAN (wide area network), wireless networks, cellular services, or other similar services to operatively connect to a remotely located host computer 118 via the Internet 150. The browser 104 on the client computing device 102 may include a user interface having a screen 108 to display webpages to a user. The client computing device 102 may further allocate some non-transitory memory 110 for the web browser 104 or browser for simplicity such that the browser 104 may interactive with, retrieve, present, and traversing information resources on the World Wide Web by using the Uniform Resource Identifier (URI) or Uniform Resource Locator (URL) associated with the information resources such as one or more web pages, images, videos, or other pieces of content.

The remotely located host computer 118 such as a Web server to which the client computing device attempts to connect may either include thereupon or be operatively coupled with one or more applications 112, one or more database(s) 114, one or more resources 116, one or more configuration files 120, or one or more scripts 122. A resource may include an action, a view, or a flow in some embodiments. In these embodiments, a flow includes one or more sub-flows each including one or more flow nodes through which a user may traverse when interacting with a website. A flow node represents a flow state that defines the experience that a user will be going through. A flow node may be further associated with one or more functionalities including, for example, one or more input variables to pass information into a flow when the flow starts or one or more modal specifications to allow running an entire flow or a portion thereof in a modal window including a pop-up window. The "modal" attribute or option may be used interchangeably throughout this application and includes an object in order to make a flow or a portion thereof modal.

The "modal" attribute or option may specify how the modal window behave when the modal window is closed.

The following pseudo-code represents an illustrated flow node specification.

```
<nodeName> : {
   history : <never | session> [optional]
   state_type : <VIEW | ACTION | FLOW | END>,
   ref : <string>, // reference to a VIEW, ACTION, or
FLOW. References are resolved using the configuration
files.
   modal : { [ optional ]
      closeButton : [Boolean] // supply a close button on the
         modal,
      navWhenDone : [Boolean] // allow the content of a modal
         window navigate the flow controller
      blockCloseWhenErrors : [Boolean] // this option does not
         allow the modal to close if error tool tips are
         showing //
   },
   inputVars : { [ optional - for FLOW nodes only] // this
option is one way to transmit information into a flow
      "varName" : varValue // may be a model value or a
         JAVASCRIPT primitive etc. . . .
   },
   transitions : {
   <on response> : <to node>,
   <on response> : <to node>,
   etc. . . .
   }
}
```

Figure 2:
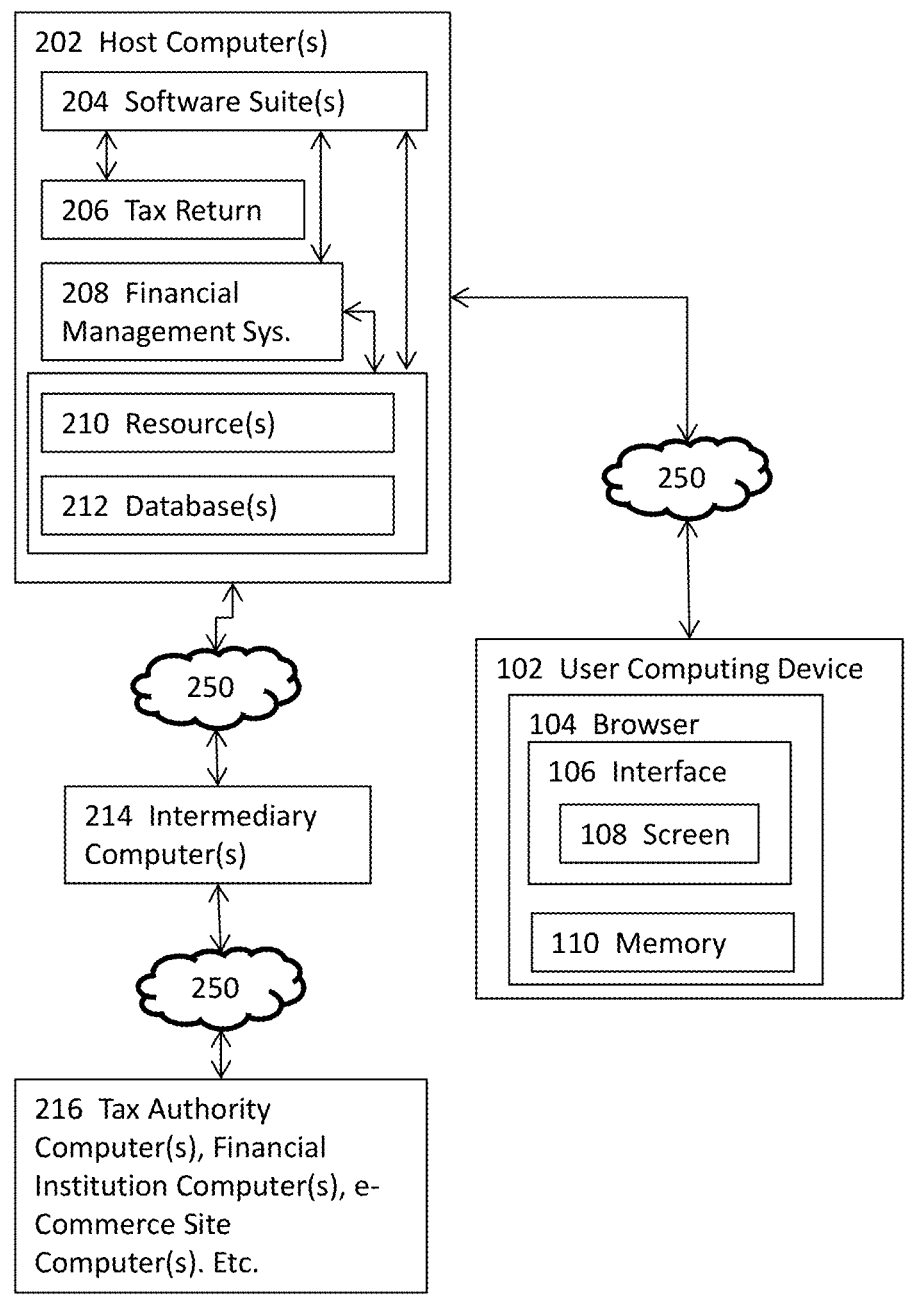
FIG. 2 illustrates another schematic diagram of a configuration-based client-side resource for customizable user experience in some embodiments.

FIG. 2 illustrates another schematic diagram of a configuration-based client-side framework for customizable user experience in some embodiments. More specifically, the illustrative schematic diagram shows a user computing device 102 including a browser 104 that further includes an interface 106 having a screen 108 and corresponds to some non-transitory memory 110. The client computing device 102 may be operatively connected to one or more host computers 202 via network 250 to access one or more software suites 204 (e.g., TURBO TAX tax return preparation application or software available from Intuit Inc.) that is used to, for example, prepare tax returns 206 or to access one or more financial management systems 208 (e.g., QUICKEN, QUICKEN On-Line, QUICKBOOKS, QUICKBOOKS On-Line, FINANCEWORKS, and MINT financial management systems or software available from Intuit Inc. for personal and/or corporate financial management, Microsoft Money® financial management system of Microsoft Corporation, and PAYCYCLE on-line human resources administrative services, now Intuit Online Payroll, available from Intuit Inc. QUICKEN, QUICKBOOKS, FINANCEWORKS, MINT and PAYCYCLE are registered trademarks of Intuit Inc., Mountain View, Calif., and MICROSOFT is a registered trademark of Microsoft Corporation, Redmond, Wash. It shall be noted that although some of the embodiments refer to some of the software applications listed above, the disclosed methods, systems, and articles also apply to other remotely hosted software applications or software application suites accessible via the Internet with full and equal effects.

The one or more software suites 204 or the one or more financial management systems 208 may also be coupled with one or more resources 210 or one or more databases 212. The one or more host computers 202 may be operatively coupled to one or more intermediate computers 214 such as some intermediate servers which may be in turn coupled to one or more computers of a tax authority (e.g., Internal Revenue Service), of one or more financial institutions (e.g., banks, credit card issuing institutions, payment gateways, etc.), or of one or more e-commerce sites 216 via network 250.

Figure 3:
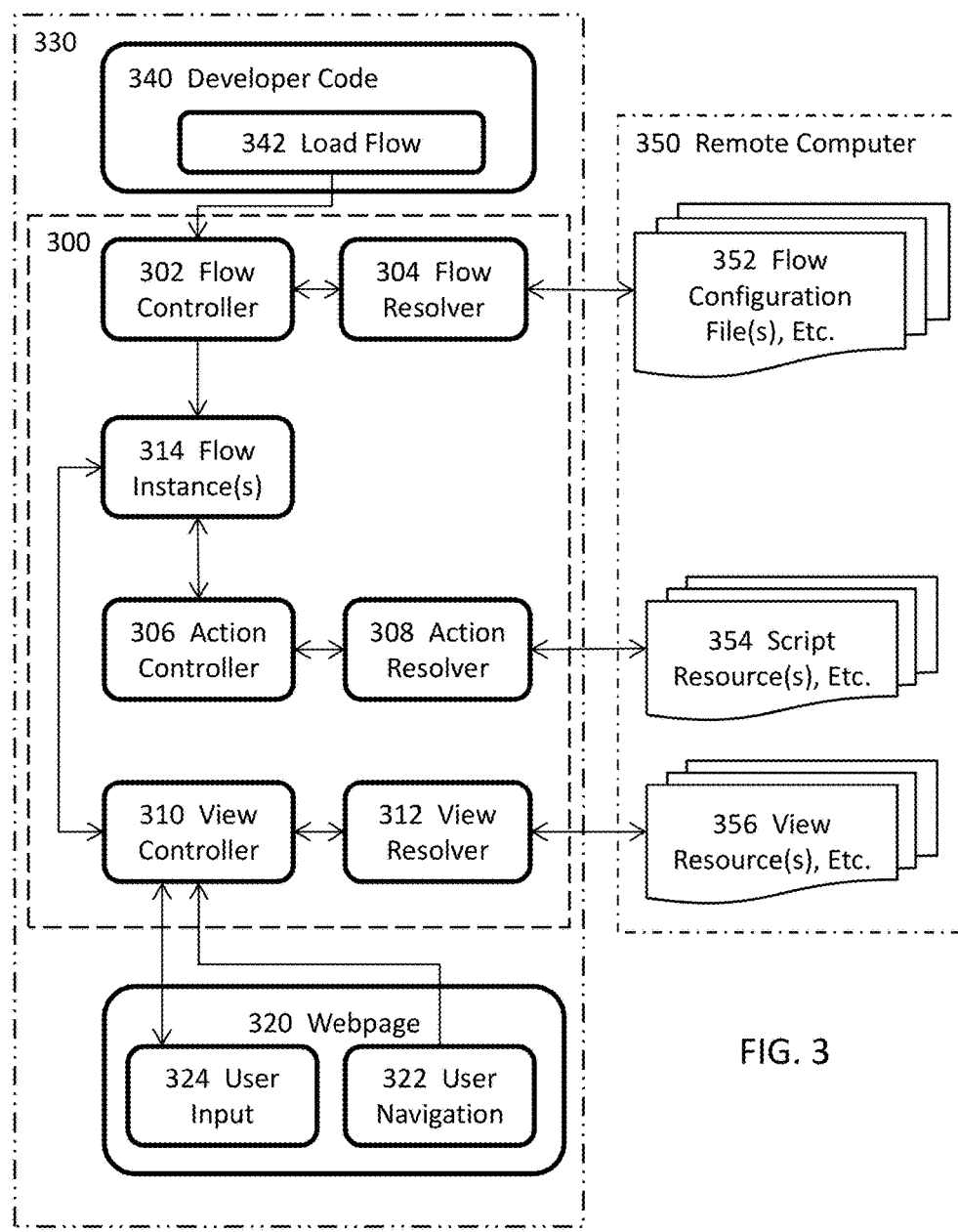
FIG. 3 illustrates a more detailed schematic flow diagram of a configuration-based client-side framework for customizable user experience with additional controllers and resolvers in some embodiments.

FIG. 3 illustrates a more detailed schematic flow diagram of a configuration-based client-side framework for customizable user experience with additional controllers and resolvers in some embodiments. More specifically, the more detailed schematic flow diagram includes a webpage 330 on a client computing device the webpage 330 having some developer code 340 to load a flow 342. In some embodiments, the developer code 340 may include code written in some scripting languages or code written in some simpler markup language. The webpage 330 further includes the client-side framework 300 that interacts with the portion of the webpage 320 (e.g., some data object model objects, etc.) visible to a user that may further includes one or more fields 324 for accepting and transmitting user input or some user initiated navigation information 322. The developer code may, upon receipt of a request from a user to access webpage (e.g., webpage 320), execute a segment 342 of the developer code 340 to load a flow as the developer desires to load. The client-side framework 300 may then execute one or more script (e.g., one or more JAVASCRIPT files) received from the remotely located computer (e.g., 118 of FIG. 1) when the user attempts to access the webpage via the client computing device (e.g., 102 of FIG. 1) to start the flow. By way of example, the flowing pseudo-code may be used to start a flow.

```
//*********************************************************
* Start up the flow controller and return the first view to the user
*
@params : flowName [string]
      args [object]
         modal [object]
            - closeButton [Boolean]
         viewport [string]
         inputVars [object]
         complete : [function]
         error : [function]
@return : none
//*********************************************************
FrameworkName.flow.loadPage (pgReference, args)
FrameworkName.flow.loadPage("somePage",
{ viewport : 'otherViewport' } );
FrameworkName.flow.loadPage("somePage",
{ modal : { closeButton : true } } );
```

In the above illustrated pseudo-code to start a flow, "@params : flowName [string]" indicates the name of the flow reference to load; "args [object]" indicates that all arguments are optional; "modal [object] - closeButton [Boolean]" places a close button on the modal window; "viewport [string]" is used to load the flow into the specified viewport and may use default viewport specified in application options if none is specified; inputVars [object] specifies the name value pairs to be injected into the flow; "complete : [function]" is used to perform a callback when flow is finished; and "error : [function]" is used to perform a callback if the flow or a sub-flow thereof errors out. It shall be noted that the aforementioned pseudo-code for starting a flow is presented in a script language. In some other embodiments, a flow may be started via a list of one or more links (e.g., HTML links) on, for example, a dashboard or in the menu. Some illustrative HTML links may include the following:

<button data-loadpage="overviewPage" data-loadpage-options="{viewport:'mainContentArea'}">Load Overview Page</button>
<button data-loadpage="overviewPage" data-loadpage-options="{modal: {closeButton : true} }">Load Overview Page in Modal</button>

In the above illustrated pseudo-code, the first "<button data-loadpage= . . . " may be used to load, for example, the Overview page; and the second "<button data-loadpage= . . . " may be used to load, for example, the overview page in a modal view. In some embodiments, the "data-loadpage . . . " options may be optional. If the viewport is not specified, the client-side framework may use the viewport from which the even came as the default viewport. If the event did not arise from a viewport, the client-side framework may use the default viewport specified in Application Options which will be described in greater details below. In some other embodiments, a flow may be started from within another flow, rather than by using a script or a list of links as described above. In these embodiments, the flow may be considered as a sub-flow of the another flow.

The client-side framework 300 includes one or more controllers such as a flow controller 302, an action controller 306, and/or a view controller 310. The client-side framework 300 may execute a segment of one or more scripts (e.g., one or more JAVASCRIPT files) to call a method to start each of the one or more controllers. The client-side framework 300 may further optionally include one or more corresponding resolvers including a flow resolver 304 corresponding to the flow controller 302, an action resolver 308 corresponding to the action controller 306, and/or a view resolver 312 corresponding to the view controller 310. In some embodiments, a flow controller allows users to specify page to page navigation in their respective applications (e.g., an online tax return preparation software suite or an online financial management software suite, etc.).

A flow controller may also allow transitioning between views, actions, flows, or any combinations thereof. A resolver such as the flow resolver 304 aids the corresponding controller to resolve the references, rather than the hard-coded or actual path names or locations of some resources, the corresponding controller receives for a resource. The resolver may examine a mapping mechanism to determine the actual location of the resource, retrieve or obtain the actual implementation of the resource from the remotely located host computer (e.g., the host computer 118 of FIG. 1), and relay the actual implementation of the resource (e.g., the actual code for an instance of an object) to the flow controller. For example, the flow controller 302 may receive a reference rather than the actual pathname or location for a flow definition object. The corresponding flow resolver 304 may identify the reference received by the flow controller 302, examine a mapping mechanism to identify the actual location or pathname to the actual implementation of the flow definition object (e.g., the piece of code of the flow definition object in JAVASCRIPT Object Notation (JSON)) stored on a remotely located host computer (e.g., a Web server).

The flow resolver 304 may then retrieve or obtain the one or more flow configuration files 352 including the actual implementation (e.g., the one or more JSON files) from the remotely located host computer or browser cache if previously requested, and relay the retrieved or obtained actual implementation of the flow definition object to the flow controller 302. In the embodiments where the client-side framework includes a flow resolver 304, the flow controller 302 receives a reference to a flow configuration object or file, instead of the actual path or location of the flow configuration object or file, and the flow resolver 304 examines a mapping mechanism to identify the actual path or actual location to the requested flow configuration object or file. The flow resolver 304 may then identify and retrieve the actual implementation of the requested flow configuration file or object from the actual location situated on a remotely located host server and then transmit the identified or retrieved actual implementation to the flow controller.

In the case of an action controller 306, the corresponding action resolver 308, if included in the client-side framework 300, may identify a reference received by the action controller 306 to one or more scripts (e.g., one or more JAVASCRIPT files), examine a mapping mechanism to identify the actual locations or pathnames to the actual implementations of the one or more scripts (e.g., one or more pieces of code of the one or more scripts) stored on a remotely located host computer (e.g., a Web server). The action resolver 308 may then retrieve or obtain the one or more script resources 354 including the actual implementations (e.g., the code segments for the one or more scripts) from the remotely located host computer, or browser cache if previously requested, and relay the retrieved or obtained actual implementations of the one or more scripts to the action controller 306.

In the case of a view controller 310, the corresponding view resolver 312, if included in the client-side framework 300, may identify a reference received by the view controller 310 to one or more webpages (e.g., one or more HTML pages), examine a mapping mechanism to identify the actual locations or pathnames to the actual implementations of the one or more webpages (e.g., one or more pieces of code of the one or more webpages) stored on a remotely located host computer (e.g., a Web server). The view resolver 312 may then retrieve or obtain one or more view resources 356 including the actual implementations (e.g., the code segments for the one or more webpages) from the remotely located host computer or browser cache if previously requested and relay the retrieved or obtained actual implementations of the one or more webpages to the view controller 310.

Upon receiving the actual implementation of the flow configuration object or file 352, the flow controller 302 may correctly interpret the flow and reproduce a flow instance 314 by, for example, executing one or more directives from the flow configuration object or file 352. In the event that the flow instance 314 may include results from execution of an act, the flow instance 314 may further send a reference to the act to the action controller 306. In some embodiments where the client-side framework does not include an action resolver, the flow instance 314 may transmit the actual path or location to the act on a remotely located computing system to the action controller 306 so that the action controller 306 may identify and retrieve script source 354 including the actual implementation of the act at the provided path or location.

In some embodiments where the client-side framework includes an action resolver, the flow instance 314 may transmit a reference to the requested act, instead of the actual path or location to the act, on a remotely located computing system to the action controller 306 so that the action resolver 308 may identify and retrieve script source 354 including the actual implementation of the act at the provided path or location on the remotely located host computer. The action resolver 308 may then relay the retrieved script resource 354 to the action controller 306 which may then execute the script resource 354 and deliver the execution results to the flow instance 314 to identify results of execution of the act. In some embodiments where the flow instance 314 may need to display a view, the flow instance may pass a reference to, instead of the actual path or location of, the requested view to the view controller 310.

The view resolver 312 may then identify the actual path or location of the requested view resource by consulting a mapping mechanism and further to retrieve the requested view resource 356 including the actual implementation of the requested view resource 356 from a remotely located host computer. The view resolver 312 may then relay the retrieved view resource 356 to the flow instance 314 to fulfill the request. In some embodiments where the client-side framework does not include a view resolver, the flow instance 314 may pass the actual path or location of the requested view resource 356 to the view controller which is responsible for retrieving the requested view resource 356 from the remotely located host computing system.

The webpage 320 may identify user input 324 (e.g., mouse clicks, data value entries, etc.) and transmit the identified user input 324 to the client-side framework 300 and may also perform some processes on the user input 324 (e.g., validating, formatting, rendering, etc.) by using a view controller 310 to render the processed user input 324 in 320 or to set data for the user input 324. The webpage 320 may also identify the navigation information initiated by the user 322 and transmit the identified navigation information back to the view controller 310 in the client-side framework 300.

By way of example, the following pseudo-code represents an illustrated flow configuration file or object (e.g., the flow configuration file 352).

```
{
  metaData : { [ optional ]
  },
  require : [optional]
  {
    css : [ "path/to/css/file.css", "path/to/css/file2.css", ... ],
    js : [ "path/to/css/file.js", "path/to/css/file2.js", ... ],
    modelDef : [ "modelDef", "modelDef2", ... ]
  }
  models : [ optional ]
    {
       modelName : { [optional]
       className : <string>,
       modelDef : <string>
       daoName : <string >
    },
    { ... },
    { ... },
    ...
  ],
  onStart : { [ optional ]
    ref : <ref> [optional]
    params :
    exp :
    async :
  },
  onEnd : { [optional ]
    ref : <ref> [optional]
    params :
    exp :
    async :
  },
  startState : <name>, // [ mandatory ]
  allowRandomAccess : <true | false>, - [ optional ] defaults to true
  <flow state>: {
    history : <never | always | session >
    state_type: <VIEW | ACTION | FLOW | END>,
```

```
    ref: <string>, // reference to a VIEW, ACTION, or FLOW
    data : {n:v, n:v, ...}
    transitions : {
       <on> : <to>,
       <on> : <to>,
       etc...
    }
  },
  <flow state> : {
    .....
  }
}
```

The "metadata" option may include any metadata deemed important or desired. The "require : . . . " option is used to load any resources that may be needed before a flow starts. For example, the flow configuration file or object includes the "require" option to load the model definitions (via "modelDef"), the JAVASCRIPT files (via "js"), and the style sheet (via "css"). The resources may be loaded asynchronously before the flow starts so that the impact by network latency on communications between a client computing device and a remote host computing system may be reduced or completely eliminated. In addition, the client-side framework may use jQuery promises as return values from functions that perform asynchronous calls.

The "require" may also be called before loading models such that the model configuration or definition of a model may reside in memory before the model is created. The "models" option is used to automatically generate one or more models that the flow may need with the constructor arguments in the "modelNam" option and the name of the data access object (DAO) in the option "daoName". The "onStart" option is optional and is used to specify functionality to execute, an action or a reference to the action to call, or an expression to evaluate when the flow for which the flow configuration file or object is created starts. The "onEnd" option is also optional and is used to specify functionality to execute, an action or a reference to an action to call, or an expression to evaluate when the flow ends.

The "async" is used to declare that the onStart actions may be performed asynchronously. The "startState" option may be mandatory to start a flow with the specified flow node. The "allowRandomAccess" is an optional option and includes a binary value (e.g., "true" or "false" indicating whether or not the flow may be navigated via jump inside the flow. The optional option "models" indicates whether a model is to be automatically generated when the flow starts. In some embodiments, the client-side framework may generate a flow scope model every time a flow starts and then removes the flow scope model when the flow ends. The "modelDef" specifies the model definition that defines a particular model, and "daoName" option specifies the name of the Data Access Object (DAO) to use for the specified model.

The following pseudo-code represents an illustrated flow (a sub-flow in this example). In this illustrated flow, the client-side framework may load the flow referenced by "docs.subflow" (e.g., by using a flow resolver) and execute the flow. When the illustrated flow is done, the flow may return a number of responses. For example, if the illustrated flow returns "done", the client-side framework may transition to the flow node "endDone". If the illustrated flow returns "start", the client-side framework may transition to the "start" flow node.

```
"subflow": {
  "state_type" : "FLOW",
  "ref" : "docs.subflow",
  "transitions" : {
  "done" : "endDone",
  "start" : "start"
  }
}
```

A view includes one or more screens that the user sees and interacts with on a website. The following pseudo-code represents an illustrated view where the view returns the response "goToActionMyThing", possibly resulting from a button click. The next flow node in the flow including the illustrated view may be a flow node with the name "'action_doMyThing'". In addition, if the view returns "startOver", the next flow node may be "start".

```
"pg1" : {
  "state_type" : "VIEW",
  "ref" : "docs.Page1",
  "transitions" : {
  "goToActionMyThing" : "action_doMyThing",
  "startOver" : "start"
  }
}
```

An action includes a script branching logic that determines which path to take in a flow and may return a variety of results. The following pseudo-code may be used to specify an action including a reference ("ref") to some resource named "ActionClass.doSomething". If this illustrated action returns the result "foo", the next flow node in the flow will be a node with the name "foo". If the illustrated action returns results other than "foo" as indicated by the wildcard "*", the flow will transition to the "start" node.

```
"action_doMyThing" : {
  "state_type" : "ACTION",
  "ref" : "ActionClass.doSomthing",
  "transitions" : {
  "foo" : "bar",
  "*" : "start"
  }
}
```

Figure 4:
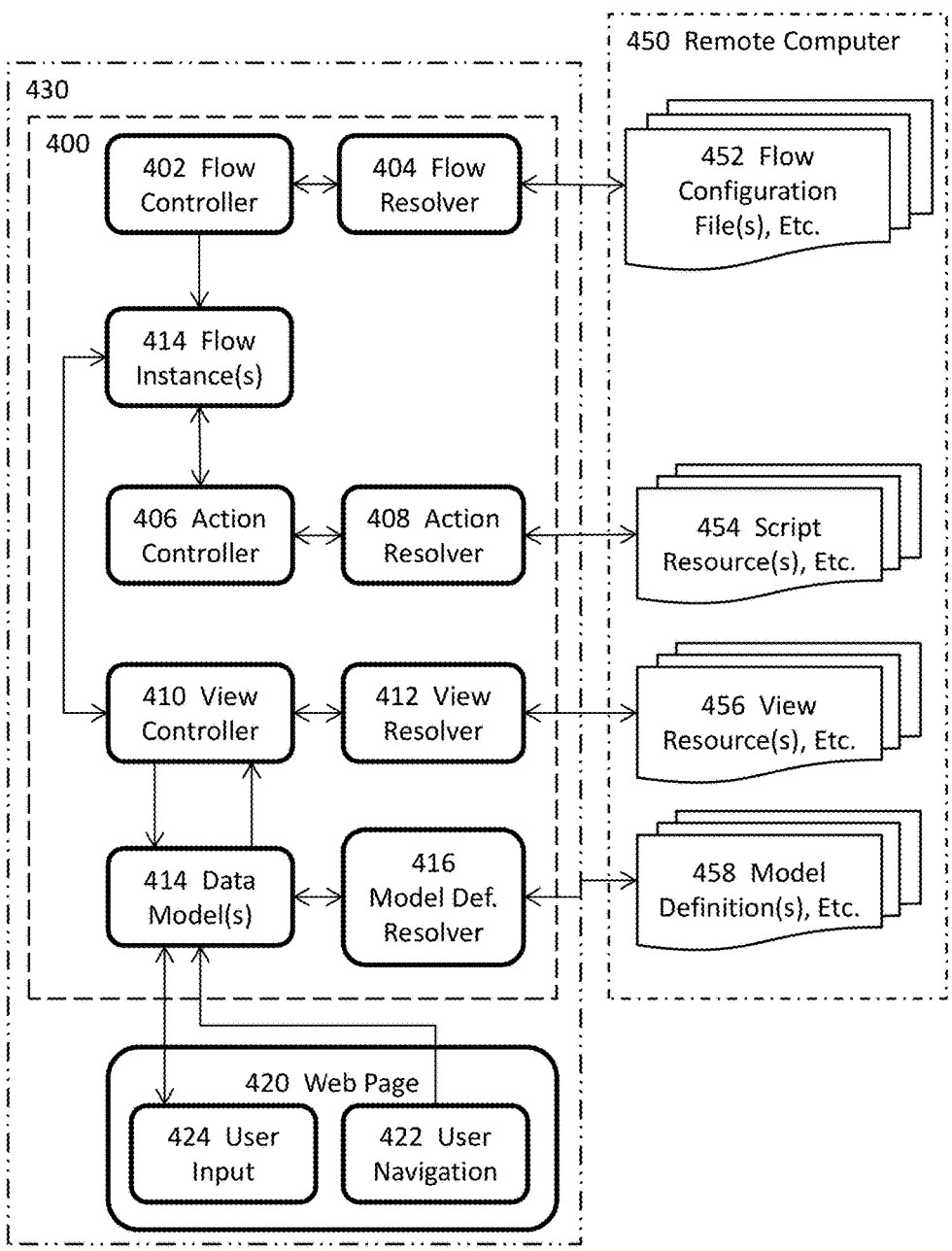
FIG. 4 illustrates another more detailed schematic flow diagram of a configuration-based client-side framework for customizable user experience with additional controllers and resolvers in some embodiments.

FIG. 4 illustrates another more detailed schematic flow diagram of a configuration-based client-side framework for customizable user experience with additional controllers and resolvers in some embodiments. FIG. 4 is substantially similar to FIG. 3 and illustrates a webpage 430 on a client computing device having some developer code (not shown and similar to the developer code 340 of FIG. 3) to load a flow (also not shown but similar to the flow 342 of FIG. 3). The webpage 430 also includes a client-side framework 400 that includes, as does FIG. 3, a flow controller 402 operatively yet optionally coupled a flow resolver 404 to retrieve one or more flow configuration files or objects 452 located on a remote computer 450 in order to reproduce one or more flow instances 414. The client-side framework 400 further includes the action controller 406 operatively yet optionally coupled to an action resolver 408 to retrieve one or more script resources 454 located on the remote computer 450 and a view controller 410 operatively yet optionally coupled to a view resolver 412 to identify and retrieve one or more view resources 456 from the remote computer 450.

The webpage also includes the webpage 420 having user input 424 and user navigation visible to users in substantially similar manners as those described for FIG. 3 above. The differences between FIG. 3 and FIG. 4 include one or more data models 414 which interact with the view controller 410 to load input definitions and may provide one or more model definitions or configurations to the view controller 410. In some embodiments where the client-side framework 400 includes a model definition resolver 416, the model definition resolver 416 may receive a reference to a model from data models 414, identify the actual path or location of the data model definitions or configurations for the reference by checking a mapping mechanism, and retrieve the model definition or configuration objects 458 including the actual implementation of the model at issue from the remote computer 450 at the identified path or location. Once the model definition or configuration resolver 416 retrieves the model definition object 458 located on the remotely located computing system 450, the model definition resolver 416 may transmit the model definition object 458 to the data models 414 to build the model at issue.

Figure 4A:
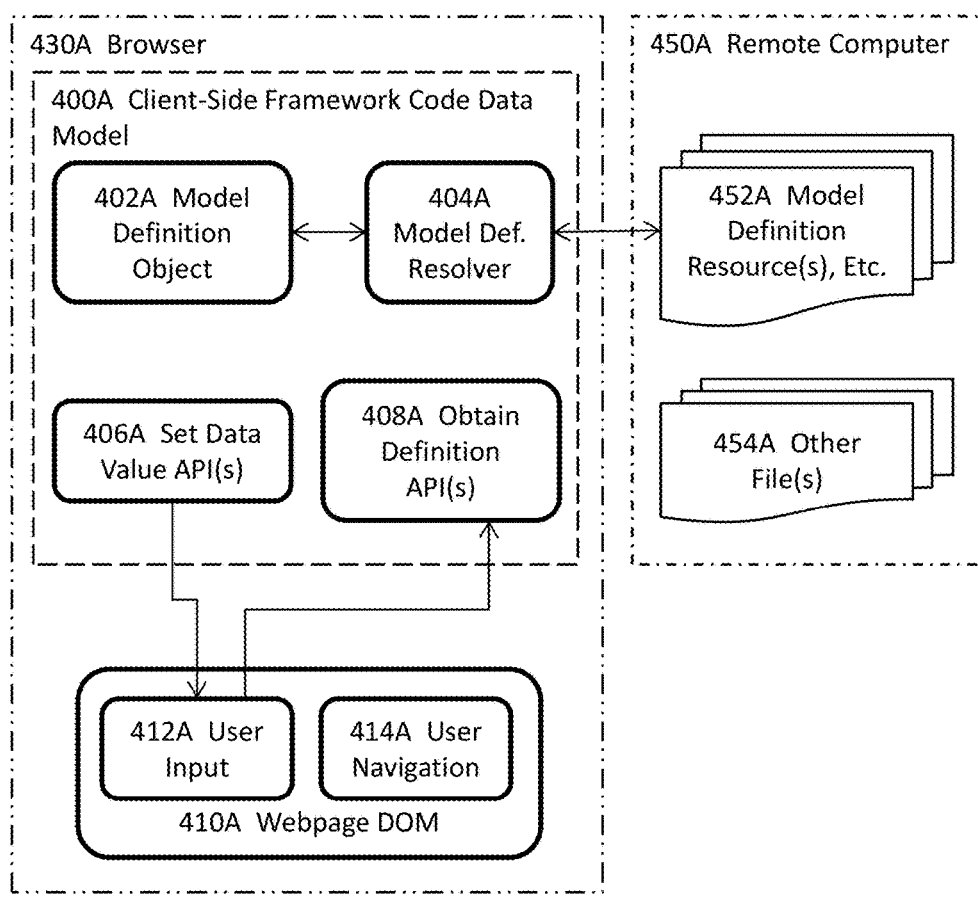
FIG. 4A illustrates a high level schematic diagram of an illustrative implementation for model definitions and constraint enforcement in some embodiments.

FIG. 4A illustrates a high level schematic diagram of an illustrative implementation for model definitions and constraint enforcement in some embodiments. As a summary for the illustrative implementation, a client computing device identifies a model of a webpage and data to be populated into the model of a webpage. The client computing device identifies a request for a reference to a model definition resource, instead of a request for the model definition resource itself. Upon visiting the webpage, the client computing device initializes a model definition resolver and one or more application programming interfaces by executing a script (e.g., a JavaScript file) from a remote host computer hosing the webpage. The client computing device invokes the model definition resolver to identify the actual location of the model definition resource from a remote computer by using a mapping mechanism that correlates the reference with the actual location of the model definition resource.

The model definition resolver obtains the actual implementation of the requested model definition resource from the remote host computer by referencing the actual location of the requested model definition resource on the remote host computer. The model definition resource may include an object that belongs to a model definition class that read in model definition or configuration objects that describe one or more constraints on one or more attributes of a model and specify information about each data entry in a model as well as high level information about the model. The client computing device may further invoke one or more APIs to perform constraint enforcement on the identified data with respect to the identified model by using the model definition resource obtained from the remote host computer. Upon successful performance of constraint enforcement, the client computing device may perform data binding for the data and the model and save the identified data, which may be further processed during the performance of constraint enforcement, into one or more repositories of data models.

In the illustrative implementation illustrated in FIG. 4A, a browser 430A located on a client computing device is operatively communicating with a remote host computer 450A. The operating system of the client computing device may allocate some non-transitory memory for the browser 430A. The allocated memory may further accommodate a client-side framework code data model 400A and webpage DOM (Document Object Model) elements 410A visible to users and for representing and interacting objects in various markup languages (e.g., HyperText Markup Language (HTML), Extensible HyperText Markup Language (XHTML), Extensible Markup Language (XML), etc.)

The client-side framework code data model 400A may include a model definition object 402A operatively coupled with a model definition resolver 404A interacting with model definition resources 452A located on the remote host computer 450A. The model definition resources 452A may be implemented in separate files or objects—one file or object for each model definition resource. The model definition resources 452A may also be grouped into one or more groups, each represented as a file or object. The model definition resources 452A may also be incorporated in a single configuration file or object. For example, the model definition resources 452A may be incorporated into the flow configuration file or object in JSON (JavaScript Object Notation). The following pseudo-code including inline comments enclosed between double forward slashes represents an illustrated model definition configuration resource:

```
{
    metaData : { // describe constraints at the model level //
        version : <int>
        mutable : <Boolean>, // whether elements may be
            dynamically added to this model definition //
        groupId: <array>, // Framework will group models based
            on the groupId for iterating. May be used for multiple
            copy functionality //
    },
    modelElement : {
        defaultValue: <value to be auto-assigned to this element>
            // syntax is $[model.property] if default to another
            model value, else a string value, //
        validate: <array> // list of validators to be applied to this
            element, //
        format: <string> // formatter to be applied to this element,
            //
        type: <STRING | BOOLEAN | NUMBER | DATE |
            COLLECTION>,
        accessibility : <string> // reader text for the element //
        placeholderText : <string> // default text showing in
            HTML5 compliant browsers //
        mapping : <descriptions of how an element is mapped to
            persistent storage>,
    },
    . . .
}
```

A model definition may then be created based on the above model definition file by using the following illustrative convention:

def=new ModelDefinition(config)

A data model instance may then be created by using the data model class, and the name of the model definition or the model definition resource may be passed as an argument for creating the data model instance by using the following convention:

model=new dataModel( { modelDef : def} );

In the above example, any data added to the created model through, for example, API 406A need to pass the constraints set forth in the model definition resource (e.g., a model definition file in JSON and stored on a remote host computer).

The remote host computer 450A may further include one or more other files 454A such as one or more flow configuration resources, one or more action resources, one or more view resources, etc. The model definition resolver includes an instance of a model definition resolver object and is a type of resource resolver. The model definition resolver 404A receives a request for reference to a resource or the reference itself from the model definition object 402A and identifies or determines the actual location of the requested resource by using a mapping mechanism.

The model definition resolver 404A may then obtain the actual implementation of the requested resource from the remote host computer 450A and return the obtained actual implementation of the requested resource to the requester (e.g., the model definition object 402A) for creating one or more models or data models. More details about a resource resolver is described in U.S. application Ser. No. 14/104, 859, entitled "METHODS, SYSTEMS, AND ARTICLES OF MANUFACTURE FOR CONFIGURATION-BASED CLIENT-SIDE RESOURCE RESOLUTION FRAMEWORK FOR CUSTOMIZABLE USER EXPERIENCE", the contents of which were previously expressly incorporated by reference for all purposes. The client-side framework code data model 400A may further include one or more application programming interfaces (API's) 406A for setting data values and one or more application programming interfaces for obtaining definitions 408A.

The one or more APIs 408A may obtain, for example, the definitions for the requested key from the model definition, verify whether or not the key is allowed in the model, and verify whether or not the value type matches the type specified in the key's definition. If both verifications pass, the one or more APIs 408A may save the key-value pair in the data model's repository. The webpage DOM elements 410A may include user input or one or more user input fields 412A for receiving user input and some user navigation 414A providing user initiated navigation information or events (e.g., user's clicking on the "Next" button, user's checking some radio buttons, user's entry of some information, etc.) The user input 412A in the webpage DOM 410A interacts with the one or more application to render the user input field in 412A programming interfaces for setting data values 406A and the one or more application programming interfaces for obtaining definitions or configurations 408A to obtain user input from the webpage DOM 410A.

A model includes an instance of a model class and works in concert with the model definition class to impose one or more constraints on the type(s) of data and data elements that may be inserted or incorporated in that model. The model definition classes read in model definition or configuration objects that describe one or more constraints on one or more attributes of a model and specify information about each data entry in a model as well as high level information about the model. A validator, on the other hand, validates whether certain data entered in a model causes any errors. Model definition classes or objects and validators allow developers to enforce data types and validate properties of models. Model definition classes also allow developers to specify one or more constraints on a data element that may be entered into a model of interest and to keep invalid or undesired data elements out of the models.

When rendering the user input fields, information from the model definition may be used to apply one or more framework specific attributes to the field that define various types of information. These various types of information may include, for example but not limited to, data types (e.g., string, Boolean, etc.), one or more validation rules for validating data or information, one or more formatting rules for automatically formatting data, default values of various variables, or accessibility information or assistive technologies describing or providing for computer accessibility in human-computer interaction, etc. The user input transmitted to the APIs 408A may trigger data binding to the data model. For example, the process flow may bind the user interface elements to one or more application data models with the MVVM (Model-View, View-Model) pattern.

The process flow may further perform input binding by using one or more attributes or tags specific to the client-side framework. In some of these embodiments, a bound control comprises a widget or HTML input element whose value is tied or bound to a field in a data model such that changes made to data within the control may be automatically saved to the data model when the control's "valueCommit" or blur event triggers. A blur event may include an event the occurrence of which causes a field in a data model to lose focus. For example, a blur event for an input field expecting an area code of a phone number may trigger as soon as or shortly after a three-digit number is entered into the field.

The occurrence of the illustrated blur event may cause the current field to lose focus and the data model to proceed to, for example, the next field or a navigation button (e.g., "Next" or "OK"). In these embodiments, the client-side framework may use data binding so that a piece of data changed in a view may be automatically updated in the corresponding data model. Various approaches may perform the input binding by adding a tag or attribute "data-bind" to the element to be bound. An illustrative format of the data-bind attribute or tag may include "<model namespace 'dot'<model field name>", for example. The model namespace may be dot delimited. The following illustrates some pseudo-code for input binding by way of examples.
<input data-bind="MyModel.myValue"/>
<input data-bind="my.model.namespace.myValue"/>

The above illustrative pseudo-code may bind the input of the specified field to the data model having the name "MyModel" and the field "myValue". If the value of MyModel.myValue is changed by any other entity, the changes may be reflected in the specified input field. Data binding may be applied to any input element on a page including, for example but not limited to, input field(s), radio button(s), checkbox(es), select list(s), etc. By way of example, the following pseudo-code with comments following double forward slashes may be used for these purposes.
<input type="radio" name="radioGroup" value="Framework" data-bind="MyModel.myRadioValue" />
<input type="radio" name="radioGroup" value="ROCKS" data-bind="MyModel.myRadioValue" /> // (may set the 'value' of the selected radio button in the model)
<input type="checkbox" data-bind="MyModel.myCheckBoxValue" /> // (may set Boolean true or false in the model)
<select data-bind="MyModel.mySelectValue">
<option/> . . . // (may set the value of the selected option in the model)

The input binding may include options including "defaultValues", "dataBindEvent", "bindFunction", "silent", "force", "trim", etc. More specifically, "defaultValues" may be used to set the default value of a data model by specifying the default value as a string or a reference to another data model's value. The "dataBindEvent" option may be used to specify which DOM events may trigger a data change event on the corresponding input element. The "bindFunction" option may be used to execute a function as a result of the value of the data model changing, and parameters passed to a function may include the data value and the jQuery wrapped element that the input element is bound to. The "silent" option may be used to update the model without broadcasting or populating the change. The "force" option may be used to set data in the data model, even if the data model is marked as read only in its corresponding model definition. The "trim" option may trim any leading and trailing whitespace from a value before the client-side framework inserts the value into a data model. More details about data binding are described in U.S. application Ser. No. 14/105,005, entitled "METHODS, SYSTEMS, AND ARTICLES OF MANUFACTURE FOR CONFIGURATION-BASED CLIENT-SIDE FLOW CONTROL FRAMEWORK FOR CUSTOMIZABLE USER EXPERIENCE", the contents of which were previously expressly incorporated by reference for all purposes.

Figure 5:
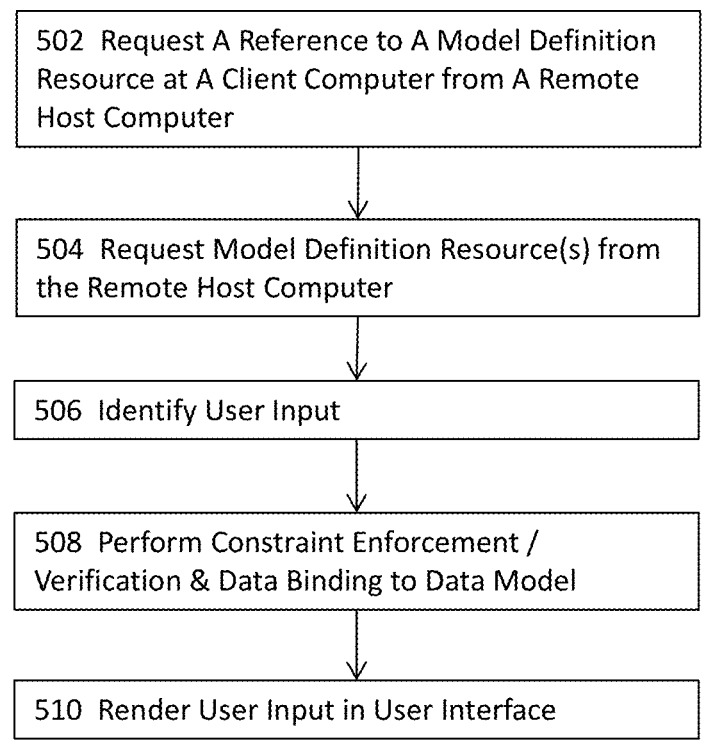
FIG. 5 illustrates a high level process flow diagram of implementing model definitions and constraint enforcement in some embodiments.

FIG. 5 illustrates a high level process flow diagram of implementing model definitions and constraint enforcement in some embodiments. The illustrated process flow may request, using a client computing device at 502, a reference to a model definition resource for a representation of a model from a remote host computer that is remotely located from the client computing device. The reference to the requested model definition resource may include, for example but not limited to, the actual pathname to the model definition resource or a link awaiting resource resolution to the model definition resource. Upon receiving the reference to the model definition resource, the process flow may invoke a model definition resolver to request the model definition resource from the remote host computer at 504. At 506, the process flow may identify user input from a webpage which a user may have accessed to use one or more applications (e.g., tax return preparation application, financial management applications, etc.) hosted on the remote host computer.

The process flow may then perform constraint enforcement on data for the model at 510. Constraint enforcement may include enforcing one or more constraints against a model or a data element therein or validating a data element to determine whether or not the data element is allowed in a model of interest. Upon successful performance of enforcing the one or more constraint associated with a model or a data element therein or successful validation of a data element, the constraint enforcement may further include data formatting to format one or more data elements and data binding to bind one or more data elements to a data model. That is, upon successful completion of validation or enforcing one or more constraints, the process flow may further perform data binding to data model at 508 to, for example, populate data into a data model or to save data to data model repository.

In some embodiments where a client-side framework as described in FIGS. 3-4 is used, constraint enforcement or data validation may be invoked by adding a framework specific attribute "data-validate" to any data element for which constraint enforcement or validation is desired. The value of the "data-validate" attribute includes a comma separated list of validators that are to be applied to the data element tagged with the "data-validate" attribute. Constraint enforcement or data validation may also be performed on the entire webpage, a portion of a webpage, or a single element. At 510, the process flow may render the user input in a user interface with the data that has been processed at 508 (e.g., validated, formatted, bound to data model(s), etc.) into one or more models for a webpage a user is currently visiting.

Figure 5A:
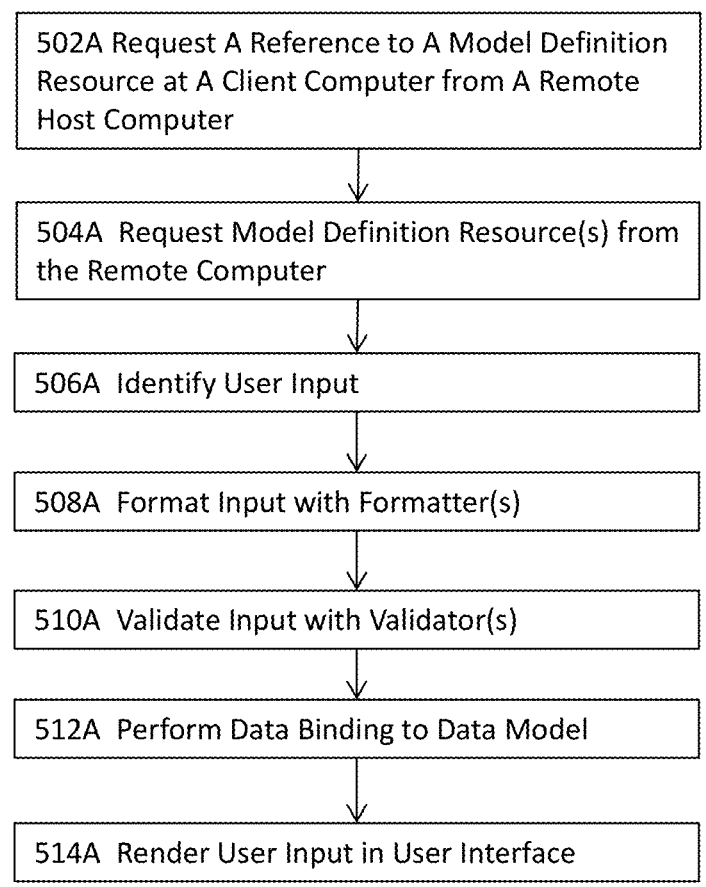
FIG. 5A illustrates a high level process flow diagram of implementing model definitions and constraint enforcement in some embodiments.

FIG. 5A illustrates a high level process flow diagram of implementing model definitions and constraint enforcement in some embodiments. The process flow may request, using a client computing device at 502A and request the model definition resource from a remote host computer at 504A in similar manners as those described for 502 and 504 of FIG. 5. The process flow may identify user input from, for example, one or more user input fields on a webpage a user is currently visiting at 506A. At 508A, the process flow may format the identified user input with one or more formatters. Formatting user input from various users may simply further processing of the user input (e.g., validation or constraint enforcement) or may reduce the amount of information to be processed.

For example, different users may use "12/25/2013", "12/25/13", "25/12/2013", "25/12/13", "Dec. 25, 2013", "December 25, 2013" to describe the same date. Formatting the user input from different users may simplify data processing involving these user inputs or may reduce the amount of data to be processed. The process flow may perform constraint enforcement or validation on data or information at 510A. If the validation passes at 510A, the process flow may perform data binding to one or more data models at 512A. The process flow may also invoke one or more application programming interfaces to populate the data into one or more data models or to save the data in one or more data model repositories. At 514A, the process flow may render the data, which has been processed in one or more of 508A, 510A, and 512A, in a user interface for a webpage a user is currently visiting.

Figure 5B:
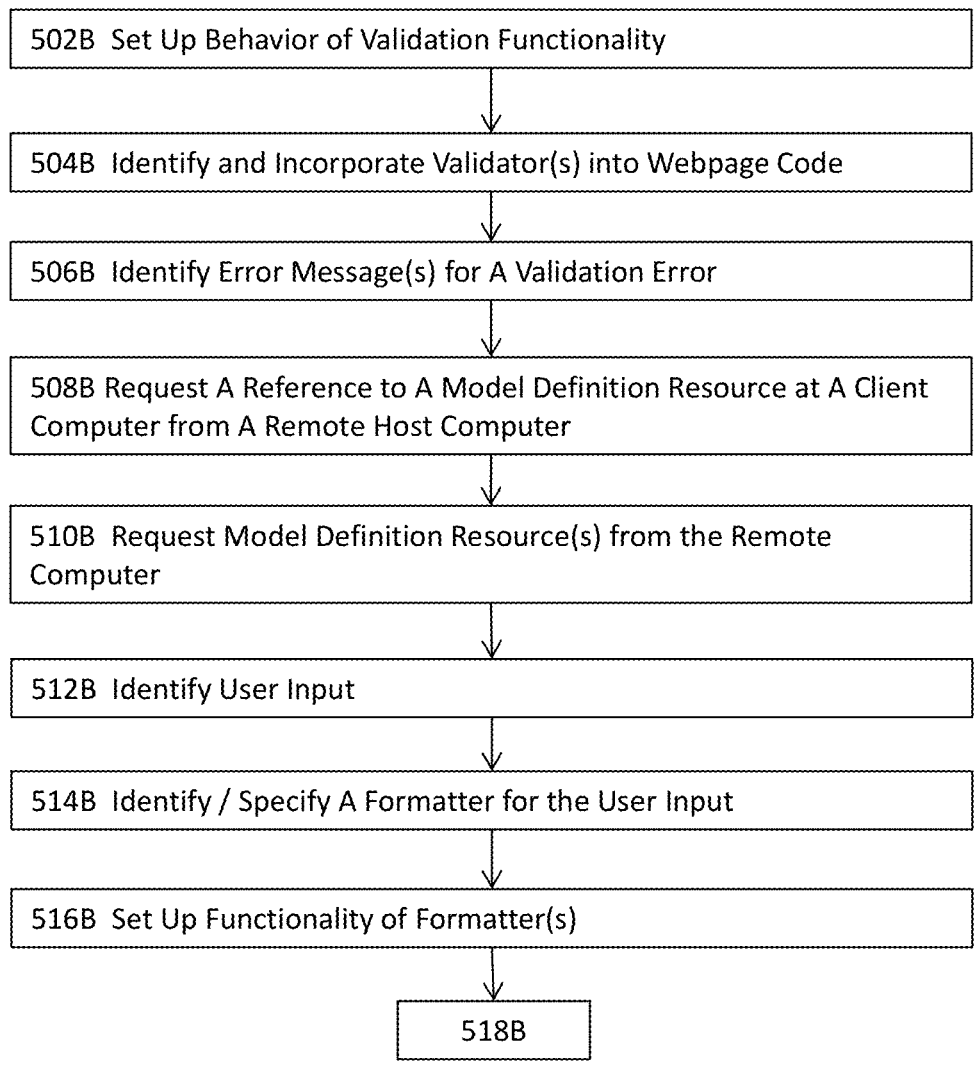
FIGS. 5B-5C illustrate a high level process flow diagram of implementing model definitions and constraint enforcement in some embodiments.
Figure 5C:
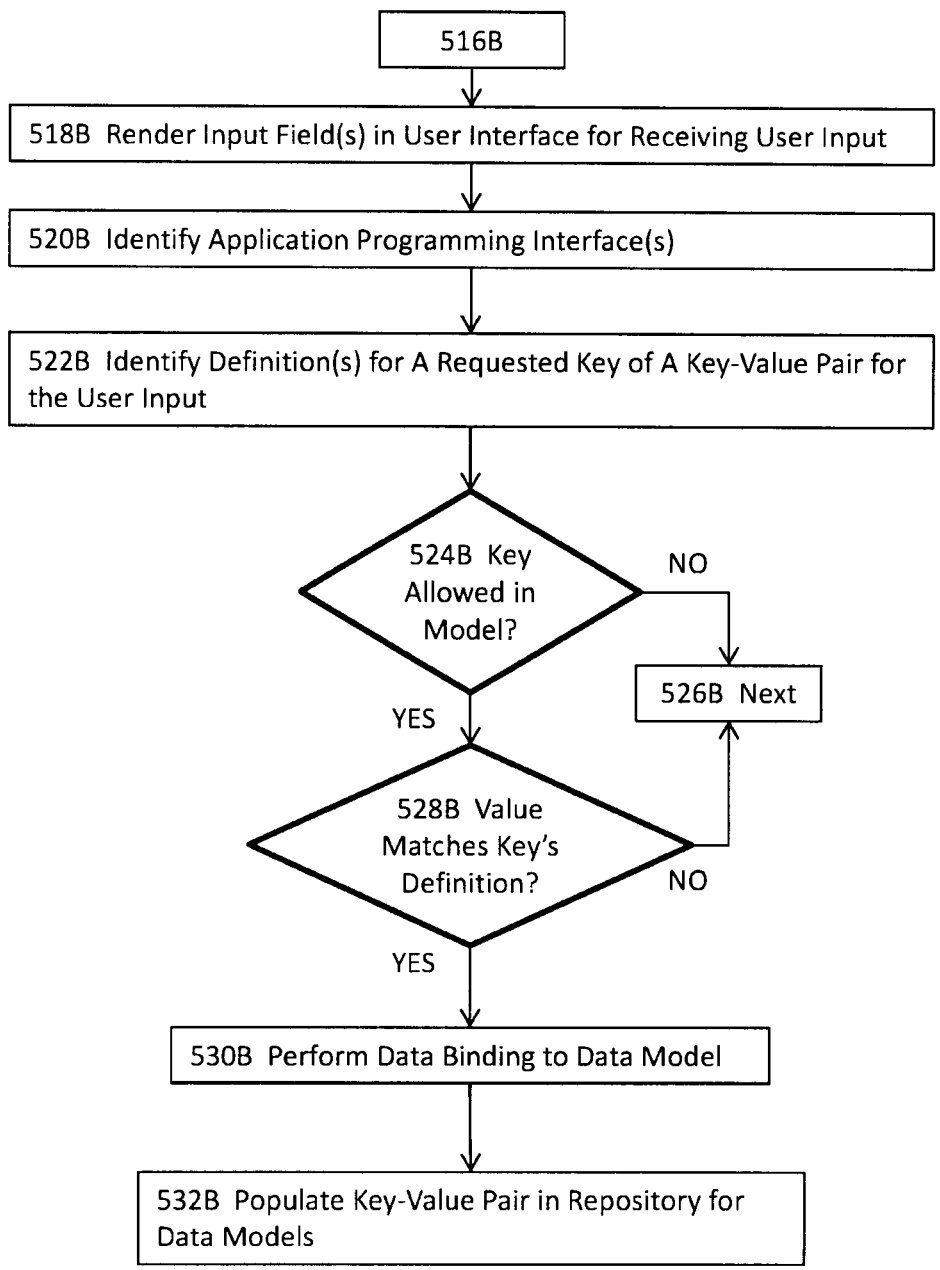

FIGS. 5B-5C illustrate a high level process flow diagram of implementing model definitions and constraint enforcement in some embodiments. The process flow may set up behavior of validation functionality at 502B. The behavior of validation function may be set up globally, on a per page basis, or on a per data element basis. In some embodiments including the client-side framework, one or more validations may be set globally when the client-side framework is initialized on a client computing device by, for example, executing a script obtained from a remote host computer hosing the website a user attempts to access. The following pseudo-code with inline comments enclosed between double forward slashes represent some default global options that may be set globally.

validationOptions : {
    tooltipPosition : 'top', // position of tooltip relative to input. supported values: 'top', 'bottom', 'right'. //
    hideOnFocus : false, // hide the tooltip when input field gets focus //
    showOnlyOne: false, // show only one error tooltip at a time //
    showMultipleErrorsPerInput : false, // if there is more than one error on the input, show all the errors. //
    suppressErrors : false, // validate and return the result, but do not show any errors messaging //
    validateOnBack : false, // no validation if the customer hits back //
    validateOnJump : false, // no validation if the customer jumps in navigation //
    useValidator: true // global on/off switch for validation //
}

Validation may also be performed on a per page basis where one or more options on a webpage may be overridden by setting these one or more options in a VIEW_SCOPE of the webpage. By way of example, the following pseudo-code shows some options that may be overridden by providing non-default values. If a non-default value is not provided, the default validation option applies.

var VIEW_SCOPE={
    validationOptions : {
        tooltipPosition : 'top', // position of tooltip relative to input. supported values: 'top', 'bottom', 'right' //
        hideOnFocus : false, // hide the tooltip when input field gets focus //
        showOnlyOne : false, // show only one error tooltip //
        showMultipleErrorsPerInput : false, // if there is more than one error, show all //
        suppressErrors : false, // validate and return the result, but do not show any errors messages //
        validateOnBack : false, // No validation if the customer hits back //
        validateOnJump : false, // No validation if the customer jumps in navigation //
        useValidator : true
    }
}

Validation may also be performed on a per instance basis. For example, the following validation options may be overridden in the HTML markup for an input that has a validator: "tooltipPOsition" and "hideOnFocus" by adding the framework specific attribute "data-validate-options" and assigning a JSON-formatted string with the desired options to be overridden with the following convention: <input data-validate="required, date('YYYY')" data-validate-options="{tooltipPosition:'right',hideOnFocus:true}"/>.

Validation may also be disabled for elements concerning how the client-side framework should behave during navigating or data jumping through a flow by using the following convention: <button data-nav="next" data-nav-options="{validate : false}">Continue</button>.

At 504B, the process flow may identify and incorporate one or more validators into a webpage. A list of illustrated validators with respective descriptions, respective parameters referenced therein, respective examples are provided in Appendix A before the Claims section. The process flow may identify or determine one or more error messages for a validation error at 506B. In some embodiments, the process flow may identify a custom error message by overriding a default message. In some embodiments including the client-side framework, messages may be appended after one another by adding the framework specific attribute ":message" if multiple validators are specified for a data element as shown in the following example:

<input data-validate="required:message('you must enter a date'), date('MM/YYYY'):message('the format should be: MM/YYYY')" />, where the message "the format should be: MM/YYYY" is added to the message "you must enter a date" by using the attribute ":message".

At 508B, the process flow may request, using a client computing device at 508B, a reference to a model definition resource from a remote host computer that is remotely located from the client computing device in substantially similar manners as those described for 502 of FIG. 5. In some embodiments including a client-side framework as described above with reference to FIGS. 3-4, the process flow may use the client-side framework at 508B. Upon receiving the reference to the model definition resource, the process flow may invoke a model definition resolver to request the model definition resource from the remote host computer at 510B.

The process flow may identify user input entered via, for example, a user interface in a browser on the client computing device at 512B. For example, the process flow may identify personal information, annual gross income, taxable income, various itemized deductions, etc. during the user's visit on the webpages for a tax return preparation application hosted on a remote host computer. Upon identifying the user's input, the process flow may identify or specify one or more formatters for the identified user input at 514B. These one or more formatters may include one or more existing formatters provided with the process flow, one or more custom formatters created by the developer of the process flow, or any combinations thereof. The following pseudo-code represents a custom formatter to remove white space, where "Framework" represents the client-side framework.

```
var     whitespaceRemover=Framework.validation.Input
Strategy. extend({
    format : function ($el, event, param, param, etc. . . . ) {
    // remove whitespace
    var val=$el.val( );
    if (val.length) {
        val=val.replace(/^[\s]+|[\s]+$/g, " ");
    }
    $el.val(val);
    }
});
```

The customer formatter may be called into the webpage by using the following illustrative convention: <input data-format="foo" />. The client-side framework may include an API to the above custom formatter (or other custom formatters) may be included and used in the client-side framework. An illustrative API may be as follows: Framework.validation.registerInputStrategy(strategyName, strategyObj); Framework.validation.registerInputStrategy("foo", whitespaceRemover);

In some embodiments including the client-side framework, a custom validator may be created by modifying one or more properties of an existing validator by using, for example, the following illustrative application programming interface: Framework.validation.overrideInputStrategy (strategyName, overrideObj), where "overrideObj" represents an object that modifies the existing properties.

In an illustrative client-side framework "Framework" as described in FIGS. 3-4, existing properties that may be overridden include:
validateIfEmpty (Boolean)
defaultMessage (string)
validate (function)
exceptions (array of exceptions to the basic rules)
regex (regular expression)
defaultMask (string that represents the mask)
getError (function)
Global message override
    Framework.validation.overrideInputStrategy('after', {
    defaultMessage : 'enter a later date please'
    });

In some embodiments including the client-side framework, any data element may be automatically formatted by a formatter by adding the framework specific attribute "data-format" to that data element. The value of the "data-format" attribute is the formatter that is to be used to format that data element. Formatting data elements may reduce the number of data elements for further processing (e.g., validation) or may reduce the number of invalid data elements. A formatter may include an application programming interface. In some embodiments, only one formatter may be specified for a data element. In some other embodiments, more than one formatter may be specified for a data element.

The process flow may further set up formatter functionality at 516B. The formatter functionality may be set up globally in the form of global formatting options. The formatting may also be switched on or off at 516B. The timing when the formatter operates on a data element may also be set up at 516B. For example, formatting may be triggered at the time the data element is entered or identified, after a certain event (e.g., clicking on "Next" or "OK" or pressing "Tab" key, "-" key, or any other key, when an input loses focus, etc.) In some embodiments including the client-side framework, formatting options may be set globally at the time of or short after the initialization of the client-side framework by using the following pseudo-code with inline comments enclosed between double forward slashes.
```
var applicationOptions : {
    . . . ,
    formatOptions : {
    useFormatter : false,
    formatEvent : "blur",
    ignoreKeyCodes : [37, 39, 8],
    autoFormat : false [OPTIONAL] format the element
        when it is the page is bound. Not necessarily when the
        user is typing in it.
        May not be necessary if your data is already formatted
    },
    . . . ,
}
```
Formatting options may also be set on a per instance basis. If the webpage includes a default formatter, this default formatter may be overridden by using the following options:
formatEvent—[string or array] // string or array of events (e.g. 'blur', 'keyup') to format on //
autoFormat—[Boolean] // automatically format the element when the page loads, no event has to take place. //

In some embodiments including the client-side framework, formatting options may be set by adding the framework specific attribute "data-format-options" and assigning the attribute to a string (e.g., a JSON-formatted string) with the options to be overridden. The following pseudo-code illustrates the use of the "data-format-options" attribute.
<input data-format="date('MM/DD/YYYY')" data-format-options="{autoFormat : true}" />
<input data-format="usmoney" data-format-options="{ formatEvent : ['blur', 'keyup'], autoFormat : true}"/>

At 518B, the process flow may render one or more fields in a user interface with the data that has been bound to one or more data models for a webpage a user is currently visiting. In some embodiments including the client-side framework, the view controller in the client-side framework may perform the rendering. The process flow may identify one or more application programming interfaces (e.g., the programming interfaces for setting data 406A or the programming interfaces 408A for obtaining definitions in FIG. 4A) at 520B for setting data values. In a reference-based framework such as the client-side framework using a hashmap to resolve references to actual resources, the API identified at 520B (e.g., the programming interfaces for obtaining definitions 408A in FIG. 4A) may identify the definitions for the requested key of a key-value pair for a data element (e.g., user input) from the model definition resources (e.g., model definition resources 452A in FIG. 4A) at 522B.

Once the definition of the requested key is identified at 522B, the identified one or more APIs (e.g., the programming interfaces for setting data 406A in FIG. 4A) may further verify whether the requested key is allowed in the particular model of interest based on the identified definition. If the verification result is negative, the process flow may proceed to 526B to continue to perform other functions (e.g., sending an error message). Otherwise, the one or more APIs identified at 520B (e.g., the programming interfaces for setting data 406A) may further verify whether the value in the key-value pair of the data element matches the identified definition for the requested key at 528B. If the verification result is negative, the process flow may proceed to 526B to continue to perform other functions (e.g., sending an error message). Otherwise, the one or more APIs (e.g., the programming interfaces for setting data 406A) may initiate or perform data binding to bind the data element to the model of interest at 530B and to populate the key-value pair for the data element in one or more data model repositories at 532B.

Figure 6:
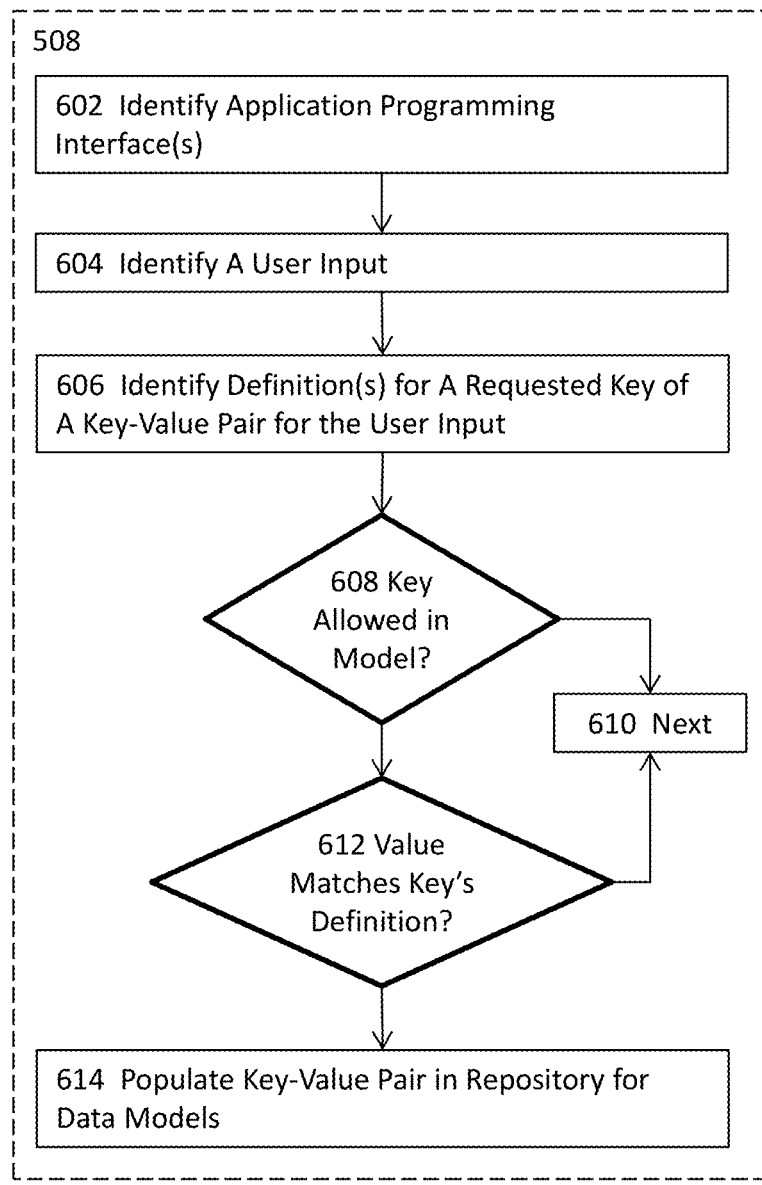
FIG. 6 illustrates a more detailed process flow diagram of a part of the process flow diagram illustrated in FIG. 5 for implementing model definitions and constraint enforcement in some embodiments.

FIG. 6 illustrates a more detailed process flow diagram of a part of the process flow diagram illustrated in FIG. 5 for implementing model definitions and constraint enforcement in some embodiments. More specifically, FIG. 6 illustrates more details about 508 of FIG. 5. The act 508 may identify one or more application programming interfaces (e.g., the programming interfaces for setting data 406A or the programming interfaces 408A for obtaining definitions in FIG. 4A) at 602 for setting data values. The act 508 may identify a user input at 604 that is represented as a key-value pair. In a reference-based framework such as the client-side framework using a hashmap to resolve references to actual resources, the one or more APIs identified at 602 (e.g., the programming interfaces for obtaining definitions 408A in FIG. 4A) may identify the definitions for the requested key of a key-value pair for a data element (e.g., user input) from the model definition resources (e.g., model definition resources 452A in FIG. 4A) at 606.

Once the definition of the requested key is identified at 606, the identified one or more APIs (e.g., the programming interfaces for setting data 406A in FIG. 4A) may further verify whether the requested key is allowed in the particular model of interest based on the identified definition at 608. If the verification result is negative, the process flow may proceed to 610 to continue to perform other functions (e.g., sending an error message). Otherwise, the one or more APIs identified at 602 (e.g., the programming interfaces for setting data 406A) may further verify whether the value in the key-value pair of the data element matches the identified definition for the requested key at 612. If the verification result is negative, the process flow may proceed to 610 to continue to perform other functions (e.g., sending an error message). Otherwise, the one or more APIs (e.g., the programming interfaces for setting data 406A) may populate the key-value pair for the data element in one or more data model repositories at 614.

Figure 7:
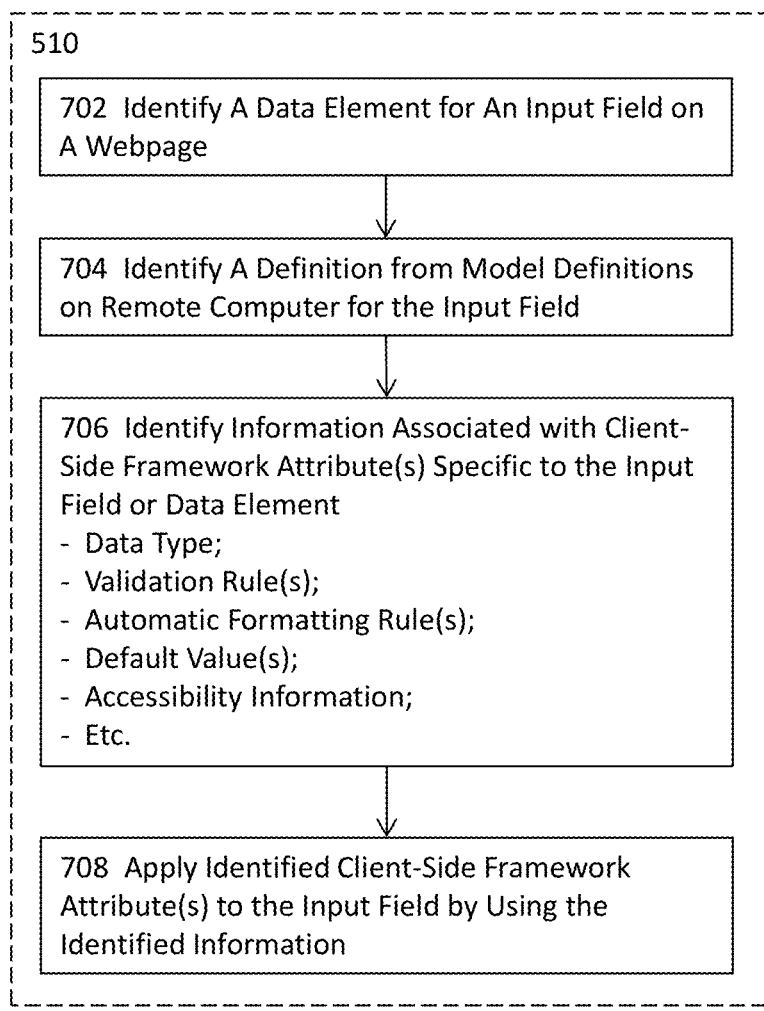
FIG. 7 illustrates a more detailed process flow diagram of a part of the process flow diagram illustrated in FIG. 5 for implementing model definitions and constraint enforcement in some embodiments.

FIG. 7 illustrates a more detailed process flow diagram of a part of the process flow diagram illustrated in FIG. 5 for implementing model definitions and constraint enforcement in some embodiments. More specifically, FIG. 7 illustrates more details about 510 of FIG. 5. The client-side framework at 510 may identify a data element for an input field on a webpage by using a client computing device at 702 and identify a definition for the data element from one or more model definition resources located on remote host computer at 704. The client-side framework at 510 may then identify information associated with the client-side framework attributes that are specific to the input field or the data element at 706.

In some embodiments, the client-side framework attributes may include, for example but not limited to, data types, one or more validation rules, one or more constraints, one or more automatic formatting rules, one or more default values for the input field, or assistive technologies describing or providing for computer accessibility in human-computer interaction, or any combinations thereof. At 708, the client-side framework at 510 may apply one or more of the identified attributes to the data element entered into the input field by using the information identified at 706. For example, the client-side framework may apply one or more validation rules or constraints to the data element for the input field at issue to verify whether the data element is valid. The client-side framework may also applying one or more formatting rules so that the associated formatter may follow the formatting rules to format the data element.

Figure 8:
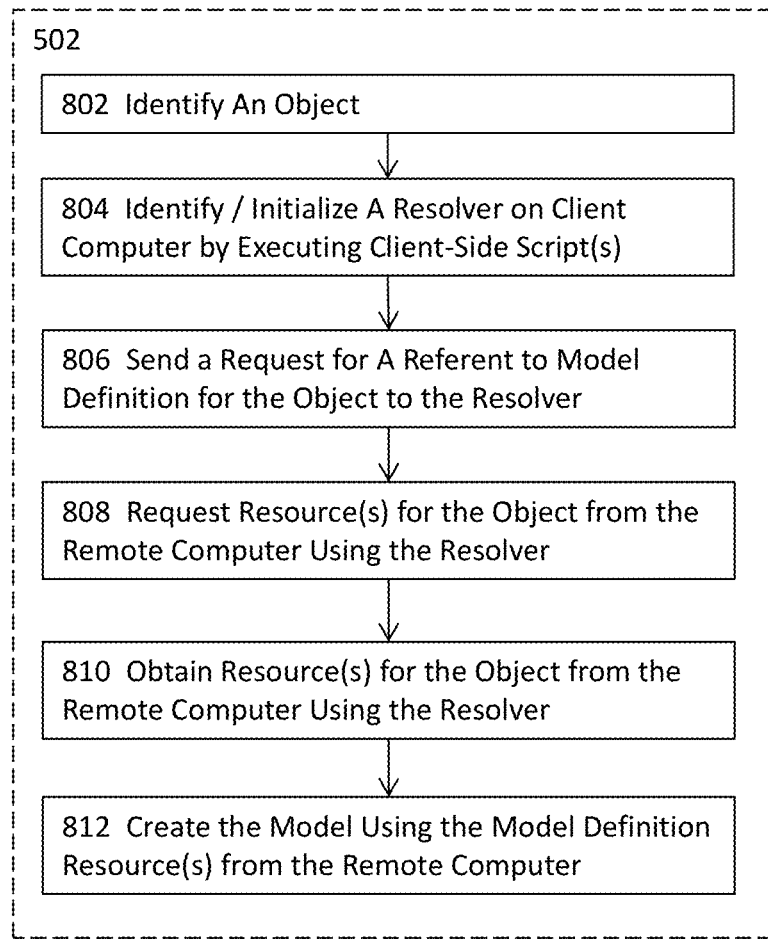
FIG. 8 illustrates a more detailed process flow diagram of a part of the process flow diagram illustrated in FIG. 5 for implementing model definitions and constraint enforcement in some embodiments.

FIG. 8 illustrates a more detailed process flow diagram of a part of the process flow diagram illustrated in FIG. 5 for implementing model definitions and constraint enforcement in some embodiments. More specifically, FIG. 8 illustrates more details about 502 of FIG. 5. The process flow at 502 may first identify an object such as a data model object described above at 802 and initialize a resource resolver on a client computing device by, for example, executing one or more client-side scripts obtained from a remote host computer at 804. In some embodiments including a client-side framework described above with reference to at least FIGS. 3-4, the one or more client-side script files are stored on a remote host computer hosting a website for a software application (e.g., tax return preparation software application, financial management software application, etc.) for which user access is desired.

When a user accesses the main page of the website hosting the software application via a browser on a client computing device, the one or more script files (e.g., one or more JavaScript files) may be transmitted from the remote host computer to, for example, the memory allocated for the browser on the client computing device. The client computing device may then execute these one or more script files to initialize the client-side framework including the resource resolver on the client computing device. The process flow at 502 may send a request for a reference to one or more model definitions for the object to the resource resolver at 806. For example, the client-side framework may send a request for a reference to a model definition, instead of a request for the model definition itself, for a data element to a model definition resolver in some embodiments.

In some other embodiments, the client-side framework or the client computing system may send a request for a model definition itself to the model definition resolver, rather than sending a request for a reference to the model definition. As described above, a model includes an instance of a model class and works in concert with the model definition class to impose one or more constraints on the type(s) of data and data elements that may be inserted or incorporated in that model. For example, a data model including a "ZIP code" input field may be subject to a constraint in the model definition file or object requiring a five-digit number for the entered data. The model definition classes read in model definition or configuration files or objects that describe one or more constraints on one or more attributes of a model and specify information about each data entry in a model as well as high level information about the model.

The process flow 502 may invoke the resource resolver to request one or more model definition resources for the object from the remote host computer at 808. For example, a model definition resolver located on the client computing system (with or without the client-side framework) may receive the reference to a model definition object or file, identify or determine the location of the actual implementation (e.g., an instance) of the model definition object or file on a remote host computer, and request the model definition resources from the remote host computer by using the identified or determined actual location.

The process flow 502 may then obtain the one or more model definition objects or files from the remote host computer at 810. In some embodiments, the model definition resolver situated on the client computing device may obtain the actual implementation of the requested one or more model definition resources from the remote host computer. For example, the model definition resolver may obtain the one or more instances or the code of the one or more model definition objects or files from the remote host computer at 810. At 812, the process flow may create the model identified at 802 by using at least the one or more model definition objects or files obtained from the remote host computer.

FIG. 9 illustrates a block diagram of components of an illustrative computing system 900 suitable for implementing various embodiment of the invention. For example, the exemplary computing system 900 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (not shown).

According to one embodiment of the invention, computer system 900 performs specific operations by one or more processors or processor cores 907 executing one or more sequences of one or more instructions contained in system memory 908. Such instructions may be read into system memory 908 from another computer readable/usable storage medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 907 may be used to perform various actions such as various actions, processes, or modules involving determining, analyzing, performing actions, etc. In some embodiments, at least one of the one or more processors or processor cores 907 has the multithreading capability.

In one embodiment, the term "logic" shall mean any combination of software or hardware that is used to implement all or part of the invention. In the single embodiment or in some embodiments, the one or more processors or processor cores 907 may be used to perform various acts such as various acts involving determining, analyzing, performing actions, etc. In some embodiments, at least one of the one or more processors or processor cores 907 has the multithreading capability to execute a plurality of threads to perform various tasks as described in the preceding sections.

Various actions as described in the preceding paragraphs may be performed by using one or more processors, one or more processor cores, or combination thereof 907. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. In an embodiment, the computer system 900 operates in conjunction with a data storage system 931, e.g., a data storage system 931 that contains a database 932 that is readily accessible by the computer system 900. The computer system 900 communicates with the data storage system 931 through a data interface 933. A data interface 933, which is coupled to the bus 906, transmits and receives electrical, electromagnetic or optical signals that include data streams representing various types of signal information, e.g., instructions, messages and data. In embodiments of the invention, the functions of the data interface 933 may be performed by the communication interface 914.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals.

Therefore, the reference to a merchant or a wireless transaction card reader are not intended to and shall not be interpreted as limiting the scope of the application or the scope of the claims, unless otherwise specifically recited or claimed. Accordingly, embodiments are intended to exemplify alternatives, modifications, and equivalents that may fall within the scope of the claims.

What is claimed is:

1. A machine implemented method for implementing model definition, constraint enforcement, and validation, the method being performed by at least a client computing device and comprising:
  a client computing device requesting a reference to one or more model definition resources for a representation of a model that pertains to a tax preparation or financial management software application at least by transmitting a request for the reference to a remote host computer hosting the tax preparation or financial management application via a network element;
  the client computing device executing a model definition resolver, residing on and stored at least partially in memory of the client computing device, that identifies or determines one or more actual locations for the one or more model definition resources at least by resolving the reference and retrieving the one or more model definition resources from the one or more actual locations, wherein the one or more model definition resources specify constraints for constraint enforcement or validation on the model;
  the client computing device reducing data processing and data to be populated into the model at least by removing a portion of the data and populating a remaining portion of the data into the model through using one or more validation modules and one or more formatting modules stored at least partially in the memory of the client computing device, the client computing device reducing the data processing and the data comprising:
    disabling the constraint enforcement or validation for a portion of a flow of the tax preparation or financial management application;
    reducing a total number of data elements and a total number of invalid data elements at least by formatting one or more user inputs for the tax preparation or financial management application at the one or more formatting modules; and
    performing the constraint enforcement or validation at the one or more validation modules on at least the one or more user inputs, which have been formatted, based in part or in whole upon at least the one or more model definition resources obtained by the model definition resolver residing on the client computing device from the remote host computer via the network element; and
  the client computing device performing data binding for the data to bind the data to the model by using a first application programming interface located on the client computing device, further comprising;
    the client computing device identifying a model definition for a requested key of a key-value pair for the data and obtaining an actual implementation of the one or more model definition resources from the remote host computer by processing the reference with a mapping module;
    the client computing device generating a first result at least by determining whether the requested key for the data is allowed in the model based at least in part upon the actual implementation of the one or more model definition resources and further generating a second result at least by determining whether a requested value of the key-value pair for the data matches the model definition; and
    the client computing device performing the data binding for the data and the model based at least in part upon the first result and the second result.

2. The machine implemented method of claim 1, further comprising the client computing device:
  identifying a user input for the model, wherein the user input includes the data that is validated by the client computing device; and
  rendering one or more fields on a display of the client computing device based at least in part upon a result of the client computing device performing the constraint enforcement or validation on the data.

3. The machine implemented method of claim 1, further comprising
  the client computing device identifying or specifying one or more formatters and one or more formatting rules for the data and setting up functionality or behavior of the one or more formatters; and
  the one or more formatters formatting the data based at least in part upon the one or more formatting rules.

4. The machine implemented method of claim 1, the client computing device performing data binding for the data further comprising the client computing device:
  identifying one or more attributes specific to a framework residing on the client computing device for the data;
  identifying one or more options for the data binding for the data; and
  performing the data binding by using at least the one or more attributes and the one or more options.

5. The machine implemented method of claim 1, the data binding for the data comprising at least one of input data binding, dynamic text binding to the model, automatic formatting for the data, and binding data on navigation.

6. The machine implemented method of claim 1, further comprising the client computing device
  populating the key-value pair for the data into a repository for the model; and
  identifying or creating one or more error messages for the constraint enforcement or validation on the data.

7. A system for implementing model definition, constraint enforcement, and validation, comprising:
  a client computing device that comprises at least a processor, a browser installed thereupon, and non-transitory memory allocated for the browser and is configured to at least:
  request a reference to one or more model definition resources for a representation of a model that pertains to a tax preparation or financial management software application at least by transmitting a request for the reference to a remote host computer hosting the tax preparation or financial management application via a network element;
  execute a model definition resolver, residing on and stored at least partially in memory of the client computing device, that identifies or determines one or more actual locations for the one or more model definition resources at least by resolving the reference and retrieving the one or more model definition resources from the one or more actual locations, wherein the one or more model definition resources specify constraints for constraint enforcement or validation on the model;

reduce data processing and data to be populated into the model at least by removing a portion of the data and populating a remaining portion of the data into the model through using one or more validation modules and one or more formatting modules stored at least partially in the memory of the client computing device, wherein the client computing device reducing the data processing and the data is further configured to:
  disable the constraint enforcement or validation for a portion of a flow of the tax preparation or financial management application;
  reduce a total number of data elements and a total number of invalid data elements at least by formatting one or more user inputs for the tax preparation or financial management application at the one or more formatting modules; and
  perform the constraint enforcement or validation at the one or more validation modules on at least the one or more user inputs, which have been formatted, based in part or in whole upon at least the one or more model definition resources obtained by the model definition resolver residing on the client computing device from the remote host computer via the network element; and
perform data binding for the data to bind the data to the model by using a first application programming interface located on the client computing device, wherein the client computing device that performs the data binding is further configured to:
  identify a model definition for a requested key of a key-value pair for the data and obtaining an actual implementation of the one or more model definition resources from the remote host computer by processing the reference with a mapping module;
  generate a first result at least by determining whether the requested key for the data is allowed in the model based at least in part upon the actual implementation of the one or more model definition resources and further generating a second result at least by determining whether a requested value of the key-value pair for the data matches the model definition; and
  perform the data binding for the data and the model based at least in part upon the first result and the second result.

8. The system of claim 7, wherein the client computing device is further configured to:
  identify a user input for the model, wherein the user input includes the data that is validated by the client computing device; and
  render one or more fields on a display of the client computing device based at least in part upon a result of the client computing device performing the constraint enforcement or validation on the data.

9. The system of claim 8, wherein the client computing device is further configured to:
  identify or specify one or more formatters and one or more formatting rules for the data;
  set up functionality or behavior of the one or more formatters; and
  format the data based at least in part upon the one or more formatting rules.

10. The system of claim 7, wherein the client computing device is further configured to:
  identify one or more attributes specific to a framework residing on the client computing device for the data; and
  identify one or more options for the data binding for the data.

11. The system of claim 10, wherein the client computing device is further configured to:
  perform the data binding by using at least the one or more attributes and the one or more options.

12. The system of claim 7, wherein the client computing device is further configured to:
  populate the key-value pair for the data into a repository for the model.

13. The system of claim 12, wherein the client computing device is further configured to:
  identify or creating one or more error messages for the constraint enforcement on the data.

14. A computer program product comprising a non-transitory machine readable storage medium having stored thereupon a sequence of instructions which, when executed by a connected device, causes the connected device to perform a set of acts for implementing model definition, constraint enforcement, and validation, the set of acts being performed by at least the client computing device and comprising:
  a client computing device requesting a reference to one or more model definition resources for a representation of a model that pertains to a tax preparation or financial management software application at least by transmitting a request for the reference to a remote host computer hosting the tax preparation or financial management application via a network element;
  the client computing device executing a model definition resolver, residing on and stored at least partially in memory of the client computing device, that identifies or determines one or more actual locations for the one or more model definition resources at least by resolving the reference and retrieving the one or more model definition resources from the one or more actual locations, wherein the one or more model definition resources specify constraints for constraint enforcement or validation on the model;
  the client computing device reducing data processing and data to be populated into the model at least by removing a portion of the data and populating a remaining portion of the data into the model through using one or more validation modules and one or more formatting modules stored at least partially in the memory of the client computing device, the client computing device reducing the data processing and the data comprising:
    disabling the constraint enforcement or validation for a portion of a flow of the tax preparation or financial management application;
    reducing a total number of data elements and a total number of invalid data elements at least by formatting one or more user inputs for the tax preparation or financial management application at the one or more formatting modules; and
    performing the constraint enforcement or validation at the one or more validation modules on at least the one or more user inputs, which have been formatted, based in part or in whole upon at least the one or more model definition resources obtained by the model definition resolver residing on the client computing device from the remote host computer via the network element; and
  the client computing device performing data binding for the data to bind the data to the model by using a first application programming interface located on the client computing device, further comprising;

the client computing device identifying a model definition for a requested key of a key-value pair for the data and obtaining an actual implementation of the one or more model definition resources from the remote host computer by processing the reference with a mapping module;

the client computing device generating a first result at least by determining whether the requested key for the data is allowed in the model based at least in part upon the actual implementation of the one or more model definition resources and further generating a second result at least by determining whether a requested value of the key-value pair for the data matches the model definition; and the client computing device performing the data binding for the data and the model based at least in part upon the first result and the second result.

15. The computer program product of claim 14, the set of acts further comprising the client computing device:

identifying a user input for the model, wherein the user input includes the data that is validated by the client computing device.

16. The computer program product of claim 15, the set of acts further comprising the client computing device:

rendering one or more fields on a display of the client computing device based at least in part upon a result of the client computing device performing the constraint enforcement or validation on the data.

17. The computer program product of claim 14, the set of acts further comprising the client computing device:

the client computing device identifying or specifying one or more formatters and one or more formatting rules for the data and setting up functionality or behavior of the one or more formatters.

18. The computer program product of claim 17, the set of acts further comprising:

the one or more formatters formatting the data based at least in part upon the one or more formatting rules.

19. The computer program product of claim 14, the set of acts further comprising:

identifying one or more attributes specific to a framework residing on the client computing device for the data;

identifying one or more options for the data binding for the data; and performing the data binding by using at least the one or more attributes and the one or more options.

20. The computer program product of claim 14, the data binding for the data comprising at least one of input data binding, dynamic text binding to the model, automatic formatting for the data, and binding data on navigation.

21. The computer program product of claim 14, the set of acts further comprising:

populating the key-value pair for the data into a repository for the model; and identifying or creating one or more error messages for the constraint enforcement or validation on the data.

* * * * *